(12) United States Patent
Ma et al.

(10) Patent No.: US 12,289,455 B2
(45) Date of Patent: Apr. 29, 2025

(54) CHROMA BLOCK PREDICTION METHOD AND APPARATUS

(71) Applicant: HUAWEI TECHNOLOGIES CO., LTD., Guangdong (CN)

(72) Inventors: Xiang Ma, Moscow (RU); Fan Mu, Shenzhen (CN); Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/581,610

(22) Filed: Feb. 20, 2024

(65) Prior Publication Data

US 2024/0195984 A1    Jun. 13, 2024

Related U.S. Application Data

(63) Continuation of application No. 17/365,372, filed on Jul. 1, 2021, now Pat. No. 11,943,451, which is a (Continued)

(30) Foreign Application Priority Data

Jan. 3, 2019   (CN) .......................... 201910005667.3

(51) Int. Cl.
*H04N 19/132* (2014.01)
*H04N 19/159* (2014.01)
*H04N 19/176* (2014.01)

(52) U.S. Cl.
CPC ......... *H04N 19/159* (2014.11); *H04N 19/132* (2014.11); *H04N 19/176* (2014.11)

(58) Field of Classification Search
CPC .. H04N 19/159; H04N 19/132; H04N 19/176; H04N 19/105; H04N 19/11;
(Continued)

(56) References Cited

U.S. PATENT DOCUMENTS

2006/0188018 A1    8/2006  Lin
2018/0205946 A1    7/2018  Zhang et al.
(Continued)

FOREIGN PATENT DOCUMENTS

CN    103096057 A   *  5/2013  ............. H04N 19/11
CN    103141103 A      6/2013
(Continued)

OTHER PUBLICATIONS

Document: JVET-L0340_r1, Xiang Ma et al., CE3: CCLM/MDLM using simplified coefficients derivation method (Test 5.6.1, 5.6.2 and 5.6.3), Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.
(Continued)

*Primary Examiner* — Hesham K Abouzahra
(74) *Attorney, Agent, or Firm* — WOMBLE BOND DICKINSON (US) LLP

(57) ABSTRACT

This application provides a chroma block prediction method and apparatus. The method includes: obtaining chroma values of chroma samples; obtaining, luma values of luma samples corresponding to the chroma samples; obtaining, from the luma values, a first luma set and a second luma set; grouping the chroma values into a first chroma set and a second chroma set; determining a scaling coefficient in a linear model based on an average value of luma values in the first luma set, an average value of luma values in the second luma set, an average value of chroma values in the first chroma set, and an average value of chroma values in the second chroma set; determining, based on the scaling coefficient, an offset factor in the linear model; and determining prediction information of the chroma block based on the scaling coefficient and the offset factor.

18 Claims, 13 Drawing Sheets

Related U.S. Application Data continuation of application No. PCT/CN2019/124399, filed on Dec. 10, 2019.

(58) Field of Classification Search
CPC .... H04N 19/61; H04N 19/182; H04N 19/186; H04N 19/593
See application file for complete search history.

(56) References Cited

U.S. PATENT DOCUMENTS

| | | | |
|---|---|---|---|
| 2018/0234687 A1 | | 8/2018 | Gupte et al. |
| 2022/0078453 A1* | | 3/2022 | Tamse .................. H04N 19/186 |

FOREIGN PATENT DOCUMENTS

| | | | | |
|---|---|---|---|---|
| CN | 103650512 A | | 3/2014 | |
| CN | 103688533 A | | 3/2014 | |
| CN | 103918269 A | | 7/2014 | |
| CN | 104871537 A | * | 8/2015 | ............. H04N 19/11 |
| CN | 105723707 A | | 6/2016 | |
| CN | 109005408 A | | 12/2018 | |
| GB | 2571312 A | | 8/2019 | |
| WO | 2013169049 A1 | | 11/2013 | |

OTHER PUBLICATIONS

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Ma (Huawei) X et al: "CE3-related: Classification-based mean value forCCLM coefficients derivation", JVET-L0342_r2, 2018, 5 Pages.

Van Der Auwera (Qualcomm) G et al: "Description of Core Experiment3 (CE3): Intra Prediction and Mode Coding", JVET J1023 r2, 2018, 49 Pages.

Choi (LGE) J et al: "CE3-related : Reduced number of reference samples forCCLM parameter calculation", JVET-L0138_v2, 2018, 5 Pages.

Sato (Sony) K: "Complexity Reduction of Chroma Intra Prediction by Reconstructed Luma Samples", JCTVC-F431, 2011, 3 Pages.

Anonymous: "Median—Wikipedia, the free encyclopedia", 2013, 13 Pages.

Woo-Shik Kim et al: "Cross-Component Prediction in HEVC", 2015, 11 Pages.

Xiang Ma, et al., CE3: Classification-based mean value for CCLM coefficients derivation (tests 2.5.1-2.5.4), Joint Video Experts Team (JVET) of ITU-T SG 16 WP 3 and ISO/IEC JTC 1/SC 29/WG 11, JVET-M0401-v1, 13th Meeting: Marrakech, MA, Jan. 2019, pp. 1-5.

K. Zhang, J. Chen, L. Zhang, X. Li and M. Karczewicz, "Enhanced Cross-Component Linear Model for Chroma Intra-Prediction in Video Coding," in IEEE Transactions on Image Processing, vol. 27, No. 8, pp. 3983-3997, Aug. 2018, doi: 10.1109/TIP.2018.2830640.

Wang Shuhui, Design and Implementation for Chroma Extensions VideoCoding Based on AVS2 Platform, Sep. 2018, 9 pages.

* cited by examiner (a) 4:4:4 format  (b) 4:2:2 format  (c) 4:2:0 format

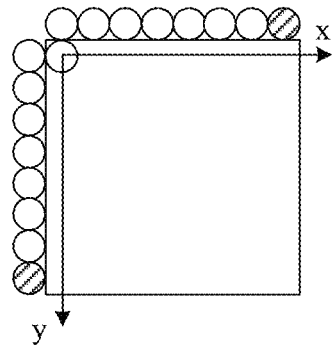 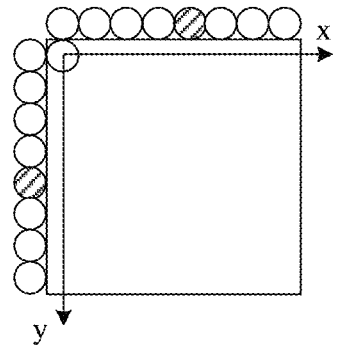
FIG. 16(a)  FIG. 16(b)
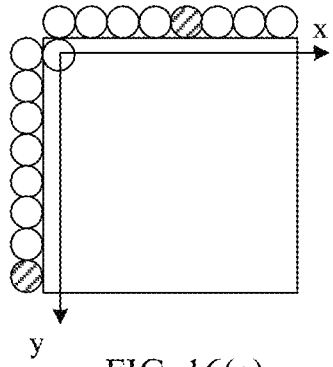 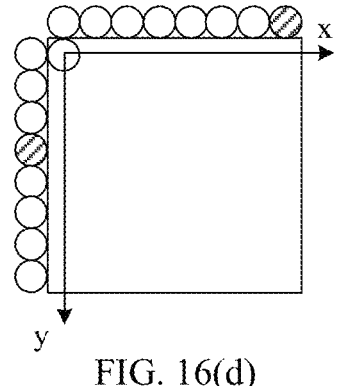
FIG. 16(c)  FIG. 16(d)
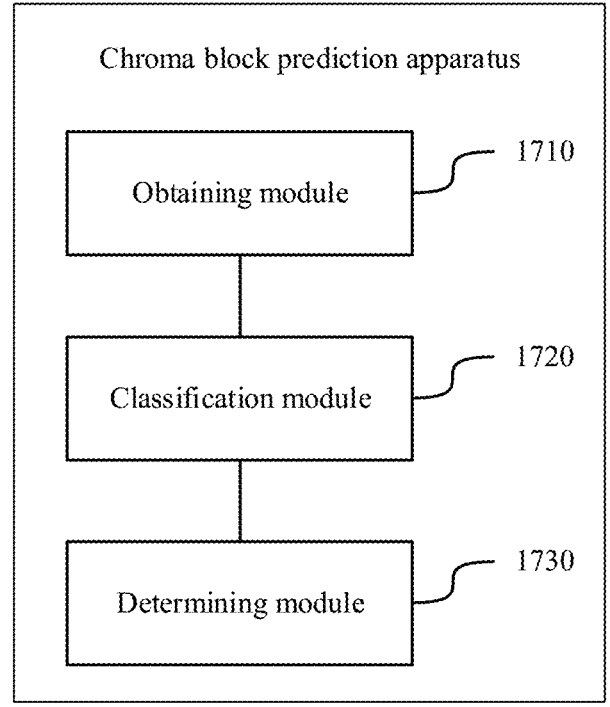
FIG. 17

CHROMA BLOCK PREDICTION METHOD AND APPARATUS

CROSS-REFERENCE TO RELATED APPLICATIONS

This application is a continuation of U.S. patent application Ser. No. 17/365,372, filed on Jul. 1, 2021, which is a continuation of International Application No. PCT/CN2019/124399, filed on Dec. 10, 2019, which claims priority to Chinese Patent Application No. 201910005667.3, filed on Jan. 3, 2019. All of the afore-mentioned patent applications are hereby incorporated by reference in their entireties.

TECHNICAL FIELD

This application relates to the field of video encoding and decoding technologies, and in particular, to a chroma block prediction method and apparatus.

BACKGROUND

With development of internet technologies, there are an increasing quantity of video application programs, and the video application programs pose an increasing quantity of requirements on high-definition videos. However, because data volumes of the high-definition videos are relatively large, if the high-definition videos need to be transmitted in limited network bandwidths, the high-definition videos need to be encoded. Generally, encoding processing mainly includes intra prediction, inter prediction, transform, quantization, entropy encoding, intra-loop filtering, and the like.

In a related technology, when intra prediction needs to be performed, prediction information of any chroma block may be determined by using a cross-component linear mode (CCLM) (which may also be referred to as a cross-component prediction (CCP) mode, or a cross-component intra prediction (CCIP) mode, or a linear mode (LM)). This is a chroma intra prediction method performed by using a correlation between luminance and chrominance. In this method, prediction information of a current chroma block is derived by using a reconstructed luma component according to a linear model, and may be represented by using the following formula: $pred_C(i,j) = \alpha * rec'_L(i,j) + \beta$. Herein, $\alpha$ and $\beta$ are intra prediction model parameters, where $\alpha$ is a scaling coefficient, and $\beta$ is an offset factor, $pred_C(i,j)$ is a predictor of a chroma sample at a location (i,j), and $rec'_L(i,j)$ is a luma reconstructed sample value at the location (i, j) after a luma reconstructed block corresponding to the current chroma block is downsampled to a chroma component resolution. The scaling coefficient and the offset factor do not need to be encoded for transmission, but are derived by using edge samples of a neighboring reconstructed block of the current chroma block and luma samples corresponding to the edge samples. A method may be:

$$\begin{cases} \alpha = \dfrac{N * \Sigma(L(n) * C(n)) - \Sigma(L(n) * C(n))}{N * \Sigma(L(n) * L(n)) - \Sigma(L(n) * L(n))} \\ \beta = \dfrac{\Sigma C(n) - \alpha * \Sigma L(n)}{N} \end{cases}$$

Herein, N is a quantity of edge samples of the neighboring reconstructed block, L(n) is an $n^{th}$ luma sample, and C(n) is an $n^{th}$ chroma sample.

In this way, a scaling coefficient and an offset factor need to be determined for each chroma block for which the CCLM is used. However, the foregoing determining process involves a large quantity of multiplications, and is relatively complex. Consequently, chroma block prediction efficiency is relatively low.

SUMMARY

To resolve a problem in a related technology, embodiments of this application provide a chroma block prediction method and apparatus. The technical solutions are as follows:

According to a first aspect, a chroma block prediction method is provided. The method includes:

obtaining chroma values of chroma samples at preset locations from neighboring samples of a chroma block; obtaining, based on neighboring samples of a luma block corresponding to the chroma block, luma values of luma samples corresponding to the chroma samples at the preset locations; classifying the obtained luma values into a first luma set and a second luma set; grouping chroma values of chroma samples corresponding to luma samples associated with luma values in the first luma set into a first chroma set, and grouping chroma values of chroma samples corresponding to luma samples associated with luma values in the second luma set into a second chroma set; determining, based on an average value of the luma values in the first luma set, an average value of the luma values in the second luma set, an average value of the chroma values in the first chroma set, and an average value of the chroma values in the second chroma set, a scaling coefficient in a linear model corresponding to the chroma block; determining, based on the scaling coefficient, an offset factor in the linear model corresponding to the chroma block; and determining prediction information of the chroma block based on the scaling coefficient, the offset factor, and luma reconstruction information corresponding to the chroma block.

In an embodiment, when intra prediction needs to be performed on a current chroma block (which may be briefly referred to as the chroma block subsequently), the chroma values of the chroma samples at the preset locations may be obtained from the neighboring samples of the chroma block. Then, the luma block corresponding to the chroma block may be determined, and the luma values of the luma samples corresponding to the chroma samples at the preset locations may be obtained based on the neighboring samples of the luma block. The obtained luma values are classified into the first luma set and the second luma set. The chroma values are automatically classified into the first chroma set and the second chroma set based on the luma values. Then, the scaling coefficient in the linear model corresponding to the chroma block is determined based on the average value of the luma values in the first luma set, the average value of the luma values in the second luma set, the average value of the chroma values in the first chroma set, and the average value of the chroma values in the second chroma set. Then, the offset factor in the linear model corresponding to the chroma block is determined based on the scaling coefficient. Finally, the prediction information of the chroma block is obtained based on the luma reconstruction information corresponding to the chroma block, the scaling coefficient, and the offset factor, where the luma reconstruction information corresponding to the chroma block includes downsampling information of a luma reconstructed block corresponding to the chroma block.

In this way, because a smaller quantity of multiplications are involved, a calculation amount can be reduced, and further, chroma block prediction efficiency can be improved.

In an embodiment, the method further includes: obtaining indication information, and determining, based on the indication information, an intra prediction mode corresponding to the chroma block, where the intra prediction mode includes at least one of a linear mode LM, a linear mode above (LMA), and a linear mode left (LML); and determining the preset locations based on the intra prediction mode corresponding to the chroma block.

In an embodiment, when performing encoding, an encoder side may encode the indication information into a bitstream, and then send the bitstream to a decoder side. The decoder side may obtain the indication information from the received bitstream, and determine, based on the indication information, the intra prediction mode corresponding to the chroma block. Then, the decoder side determines the preset locations based on the intra prediction mode corresponding to the chroma block. In this way, the decoder side may determine the intra prediction mode used for the chroma block, and then determine the preset locations based on the intra prediction mode.

In an embodiment, the obtaining chroma values of chroma samples at preset locations from neighboring samples of a chroma block includes: obtaining the chroma values of the chroma samples at the preset locations from the neighboring samples of the chroma block based on a preset correspondence between an intra prediction mode and a preset location and the intra prediction mode corresponding to the chroma block.

In an embodiment, when performing decoding, a decoder side may obtain the preset correspondence between an intra prediction mode and a location, and determine, from the correspondence, the preset locations corresponding to the intra prediction mode for the chroma block. Then, the decoder side obtains the chroma values of the chroma samples at the preset locations from the neighboring samples of the chroma block based on the preset locations.

In this way, different preset locations may be selected for different intra prediction modes, so that a chroma block prediction result can be more accurate.

In an embodiment, location coordinates of top neighboring samples of the chroma block are (0, −1), (1, −1), . . . , and (X−1, −1), and location coordinates of left neighboring samples of the chroma block are (−1, 0), (−1, 1), . . . , and (−1, Y−1), where X represents a width of the chroma block, and Y represents a height of the chroma block; and if the intra prediction mode corresponding to the chroma block is a cross-component linear mode LM, location coordinates of the chroma samples at the preset locations are (0, −1), (X−1, −1), (−1, 0), and (−1, Y−1).

In an embodiment, a rectangular plane coordinate system is correspondingly established for the chroma block. The first chroma sample in a top-left corner of the chroma block is used a coordinate origin, a horizontal direction to the right is a positive direction of an x axis, and a vertical direction to the bottom is a positive direction of a y axis. In this way, the location coordinates of the top neighboring samples of the chroma block are (0, −1), (1, −1), . . . , and (X−1, −1), and the location coordinates of the left neighboring samples of the chroma block are (−1, 0), (−1, 1), . . . , and (−1, Y−1), where X represents the width of the chroma block (that is, a quantity of samples in a width direction of the chroma block), and Y represents the height of the chroma block (that is, a quantity of samples in a height direction of the chroma block). When the intra prediction mode is an LM, the location coordinates of the chroma samples at the preset locations are (0, −1), (X−1, −1), (−1, 0), and(−1, Y−1).

In an embodiment, the location coordinates of the top neighboring samples of the chroma block are (0, −1), (1, −1), . . . , and (X−1, −1), where X represents the width of the chroma block; and if the intra prediction mode corresponding to the chroma block is a cross-component linear mode above LMA, the location coordinates at the preset locations are (0, −1), (X/4, −1), (X−1-X/4, −1), and (X−1, −1), or (0, −1), (X/4, −1), (3*X/4, −1), and (X−1, −1).

In an embodiment, a rectangular plane coordinate system is correspondingly established for the chroma block. The first chroma sample in a top-left corner of the chroma block is used as a coordinate origin, a horizontal direction to the right is a positive direction of an x axis, and a vertical direction to the bottom is a positive direction of a y axis. When the intra prediction mode is an LMA, the location coordinates at the preset locations are (0, −1), (X/4, −1), (X−1-X/4, −1), and (X−1, −1), or (0, −1), (X/4, −1), (3*X/4, −1), and (X−1, −1), where X represents the width of the chroma block (that is, a quantity of samples in a width direction of the chroma block).

In an embodiment, the location coordinates of the left neighboring samples of the chroma block are (−1, 0), (−1, 1), . . . , and (−1, Y−1), where Y represents the height of the chroma block; and if the intra prediction mode corresponding to the chroma block is a cross-component linear mode left LML, the location coordinates at the preset locations are (−1, 0), (−1, Y/4), (−1, Y−1-Y/4), and (−1, Y−1), or (−1, 0), (−1, Y/4), (−1, 3*Y/4), and (−1, Y−1).

In an embodiment, a rectangular plane coordinate system is correspondingly established for the chroma block. The first chroma sample in a top-left corner of the chroma block is used as a coordinate origin, a horizontal direction to the right is a positive direction of an x axis, and a vertical direction to the bottom is a positive direction of a y axis. When the intra prediction mode is an LML, the location coordinates at the preset locations are (−1, 0), (−1, Y/4), (−1, Y−1-Y/4), and (−1, Y−1), or (−1, 0), (−1, Y/4), (−1, 3*Y/4), and (−1, Y−1), where Y represents the height of the chroma block (that is, a quantity of samples in a height direction of the chroma block).

In an embodiment, the obtaining, based on neighboring samples of a luma block corresponding to the chroma block, luma values of luma samples corresponding to the chroma samples at the preset locations includes: determining, from the neighboring samples of the luma block, that location coordinates of a luma sample corresponding to a chroma sample at an $i^{th}$ preset location in the preset locations are $(2*X_i, 2*Y_i)$, where location coordinates of the chroma sample at the $i^{th}$ preset location are $(X_i, Y_i)$; and obtaining, from the neighboring samples of the luma block corresponding to the chroma block based on location coordinates of the luma samples corresponding to the chroma samples at the preset locations, the luma values of the luma samples corresponding to the chroma samples at the preset locations; or determining, from the neighboring samples of the luma block based on location coordinates of a chroma sample at a $j^{th}$ preset location in the preset locations, location coordinates of a plurality of samples corresponding to the $j^{th}$ preset location; determining, based on the location coordinates of the plurality of samples, location coordinates of a luma sample corresponding to the chroma sample at the $j^{th}$ preset location; and obtaining, from the neighboring samples of the luma block corresponding to the chroma block based on location coordinates of the luma samples corresponding to the chroma samples at the preset locations, the luma values of the luma samples corresponding to the chroma samples at the preset locations.

In an embodiment, when the chroma block is decoded, the location coordinates of the chroma sample at the $i^{th}$ preset location in the preset locations are $(X_i, Y_i)$, and it may be determined, from the neighboring samples of the luma block, that the location coordinates of the luma sample corresponding to the chroma sample at the $i^{th}$ preset location are $(2*X_i, 2*Y_i)$. In this way, the location coordinates of the luma samples corresponding to the chroma samples at the preset locations may be obtained.

Alternatively, when the chroma block is decoded, the location coordinates of the chroma sample at the $j^{th}$ preset location in the preset locations are $(X_j, Y_j)$. For the chroma sample at the $j^{th}$ preset location, the plurality of sample locations of the neighboring samples of the luma block corresponding to $(X_j, Y_j)$ are determined, and then the location coordinates of the luma sample corresponding to the chroma sample at the $j^{th}$ preset location are obtained based on the location coordinates of the plurality of sample locations. For example, a weighting method may be used. The location coordinates of the plurality of sample locations may be $(2*X_j, 2*Y_j)$, $(2*X_j, 2*Y_j+1)$, $(2*X_j+1, 2*Y_j)$, $(2*X_j+1, 2*Y_j+1)$, $(2*X_j+2, 2*Y_j)$, and $(2*X_j+2, 2*Y_j+1)$, and all the sample locations correspond to weighted values, which are 2/8, 1/8, 1/8, 2/8, 1/8, and 1/8 respectively. After weighting is performed, the location coordinates $(2*X_j, 2*Y_j+0.5)$ of the luma sample corresponding to the chroma sample at the $j^{th}$ preset location may be obtained. In addition, a weighting method may not be used. This is not limited in this embodiment of this application. In this way, the location coordinates of the luma samples corresponding to the chroma samples at the preset locations may be obtained. Then, the luma values may be obtained from the corresponding luma samples based on the location coordinates of the luma samples corresponding to the chroma samples at the preset locations.

In this way, the luma values can be determined more quickly.

In an embodiment, indication information is obtained from a received bitstream.

In an embodiment, when performing encoding, an encoder side may encode the indication information indicating an intra prediction mode into the bitstream, and then send the bitstream to a decoder side. The decoder side may obtain the indication information from the received bitstream.

In this way, the decoder side may determine the intra prediction mode used for the chroma block.

In an embodiment, the classifying the obtained luma values into a first luma set and a second luma set includes: determining an average value of the luma values of the luma samples corresponding to the chroma samples at the preset locations; and grouping luma values that are in the luma values of the luma samples corresponding to the chroma samples at the preset locations and that are less than or equal to the average value of the luma values into the first luma set, and grouping luma values that are in the luma values of the luma samples corresponding to the chroma samples at the preset locations and that are greater than the average value of the luma values into the second luma set.

In an embodiment, the luma values that are in all the obtained luma values and that are less than or equal to the average value of the luma values are determined, and these luma values are grouped into the first luma set. In addition, the luma values that are in all the obtained luma values and that are greater than the average value of the luma values may be determined, and these luma values are grouped into the second luma set. In this way, the luma values in the first luma set are less than the luma values in the second luma set.

In this way, a chroma block prediction speed can be increased without deteriorating encoding performance.

In an embodiment, the classifying the obtained luma values into a first luma set and a second luma set includes: sorting the luma values of the luma samples corresponding to the chroma samples at the preset locations in ascending order, to obtain a first luma value queue; and if a quantity of luma samples in the first luma value set is an even number, grouping luma values of the first half part in the first luma value queue into the first luma set, and grouping luma values of the second half part in the luma value queue into the second luma set; or sorting the luma values of the luma samples corresponding to the chroma samples at the preset locations in descending order, to obtain a second luma value queue; and if a quantity of luma samples in the second luma value set is an even number, grouping luma values of the second half part in the second luma value queue into the first luma set, and grouping luma values of the first half part in the luma value queue into the second luma set.

In an embodiment, the obtained luma values are sorted in ascending order, to obtain the first luma value queue. If the quantity of luma samples in the first luma value queue is an even number, the luma values of the first half part in the first luma value queue may be determined and grouped into the first luma set; in addition, the luma values of the second half part in the first luma value queue may be determined and grouped into the second luma set. Alternatively, the obtained luma values are sorted in descending order, to obtain the second luma value queue. If the quantity of luma samples in the second luma value queue is an even number, the luma values of the second half part in the second luma value queue may be determined and grouped into the first luma set; in addition, the luma values of the first half part in the second luma value queue may be determined and grouped into the second luma set.

In this way, a chroma block prediction speed can be increased without deteriorating encoding performance.

In an embodiment, the determining, based on an average value of the luma values in the first luma set, an average value of the luma values in the second luma set, an average value of the chroma values in the first chroma set, and an average value of the chroma values in the second chroma set, a scaling coefficient in a linear model corresponding to the chroma block includes:

$$\alpha = \frac{C_{Lmean} - C_{Rmean}}{L_{Lmean} - L_{Rmean}},$$

where $\alpha$ is the scaling coefficient in the linear model corresponding to the chroma block, $C_{Lmean}$ is the average value of the chroma values in the first chroma set, $C_{Rmean}$ is the average value of the chroma values in the second chroma set, $L_{Lmean}$ is the average value of the luma values in the first luma set, and $L_{Rmean}$ is the average value of the luma values in the second luma set.

In an embodiment, the determining, based on the scaling coefficient, an offset factor in the linear model corresponding to the chroma block includes: determining, based on the scaling coefficient, the average value of the chroma values in the first chroma set, and the average value of the luma values in the first luma set, the offset factor in the linear model corresponding to the chroma block.

In an embodiment, the average value of the chroma values in the first chroma set may be determined, and the average value of the luma values in the first luma set may be determined. Then, the offset factor in the linear model corresponding to the chroma block is determined based on the scaling coefficient, the average value of the chroma values in the first chroma set, and the average value of the luma values in the first luma set.

In an embodiment, the determining, based on the scaling coefficient, the average value of the chroma values in the first chroma set, and the average value of the luma values in the first luma set, the offset factor in the linear model corresponding to the chroma block includes: $\beta = C_{Lmean} - \alpha * L_{Lmean}$, where $\alpha$ is the scaling coefficient, $\beta$ is the offset factor in the linear model corresponding to the chroma block, $C_{Lmean}$ is the average value of the chroma values in the first chroma set, and $L_{Lmean}$ is the average value of the luma values in the first luma set.

In an embodiment, the determining, based on the scaling coefficient, an offset factor in the linear model corresponding to the chroma block includes: determining, based on the scaling coefficient, an average value of the chroma values of the chroma samples at the preset locations, and the average value of the luma values of the luma samples corresponding to the chroma samples, the offset factor in the linear model corresponding to the chroma block.

In an embodiment, the average value of all the obtained chroma values may be determined, and the average value of all the obtained luma values may be determined. Then, the offset factor in the linear model corresponding to the chroma block is determined based on the scaling coefficient, the average value of all the chroma values, and the average value of all the luma values.

In an embodiment, the determining, based on the scaling coefficient, an average value of the chroma values of the chroma samples at the preset locations, and the average value of the luma values of the luma samples corresponding to the chroma samples, the offset factor in the linear model corresponding to the chroma block includes: $\beta = C_{mean} - \alpha * L_{mean}$, where $\alpha$ is the scaling coefficient, $\beta$ is the offset factor in the linear model corresponding to the chroma block, $C_{mean}$ is the average value of the chroma values of the chroma samples at the preset locations, and $L_{mean}$ is the average value of the luma values of the luma samples corresponding to the chroma samples at the preset locations.

According to a second aspect, a chroma block prediction apparatus is provided. The prediction apparatus includes a processor and a memory, the memory is configured to store a processor executable instruction, and the processor implements the chroma block prediction method provided in the first aspect by executing the instruction.

According to a third aspect, a chroma block prediction apparatus is provided. The apparatus includes one or more modules, configured to implement the chroma block prediction method provided in the first aspect.

According to a fourth aspect, a computer-readable storage medium is provided. The computer-readable storage medium stores an instruction, and when the computer-readable storage medium is run on a computing device, the computing device is enabled to perform the chroma block prediction method provided in the first aspect.

According to a fifth aspect, a computer program product including an instruction is provided. When the computer program product is run on a computing device, the computing device is enabled to perform the chroma block prediction method provided in the first aspect.

Beneficial effects brought by the technical solutions provided in the embodiments of this application include at least the following:

In the embodiments of this application, during encoding or decoding, the chroma values of the chroma samples at the preset locations may be obtained from the neighboring samples of the chroma block. Then, the luma values of the luma samples corresponding to the chroma samples at the preset locations are obtained from the neighboring samples of the luma block corresponding to the chroma block, the obtained luma values are classified into the first luma set and the second luma set, and the chroma values are correspondingly classified into the first chroma set and the second chroma set based on the classification of the luma values. Next, the scaling coefficient in the linear model corresponding to the chroma block may be determined based on the average value of the luma values in the first luma set, the average value of the luma values in the second luma set, the average value of the chroma values in the first chroma set, and the average value of the chroma values in the second chroma set, and after the scaling coefficient is determined, the offset factor in the linear model corresponding to the chroma block may be determined based on the scaling coefficient. Finally, the prediction information of the chroma block is determined based on the scaling coefficient, the offset factor, and the luma reconstruction information corresponding to the chroma block. In this way, during encoding or decoding, a preset quantity of chroma values are selected and then classified into two chroma sets, and a preset quantity of luma values are selected and then classified into two luma sets. A scaling coefficient in a linear model corresponding to a chroma block is determined based on an average value of luma values in each luma set and an average value of chroma values in each chroma set, and further, an offset factor is determined. Because a smaller quantity of multiplications are involved, an encoding time and a decoding time can be reduced.

BRIEF DESCRIPTION OF DRAWINGS

FIG. 16(a) to FIG. 16(d) are schematic diagrams of chroma samples at preset locations; and FIG. 17 is a schematic structural diagram of a chroma block prediction apparatus.

DESCRIPTION OF EMBODIMENTS

Figure 1:
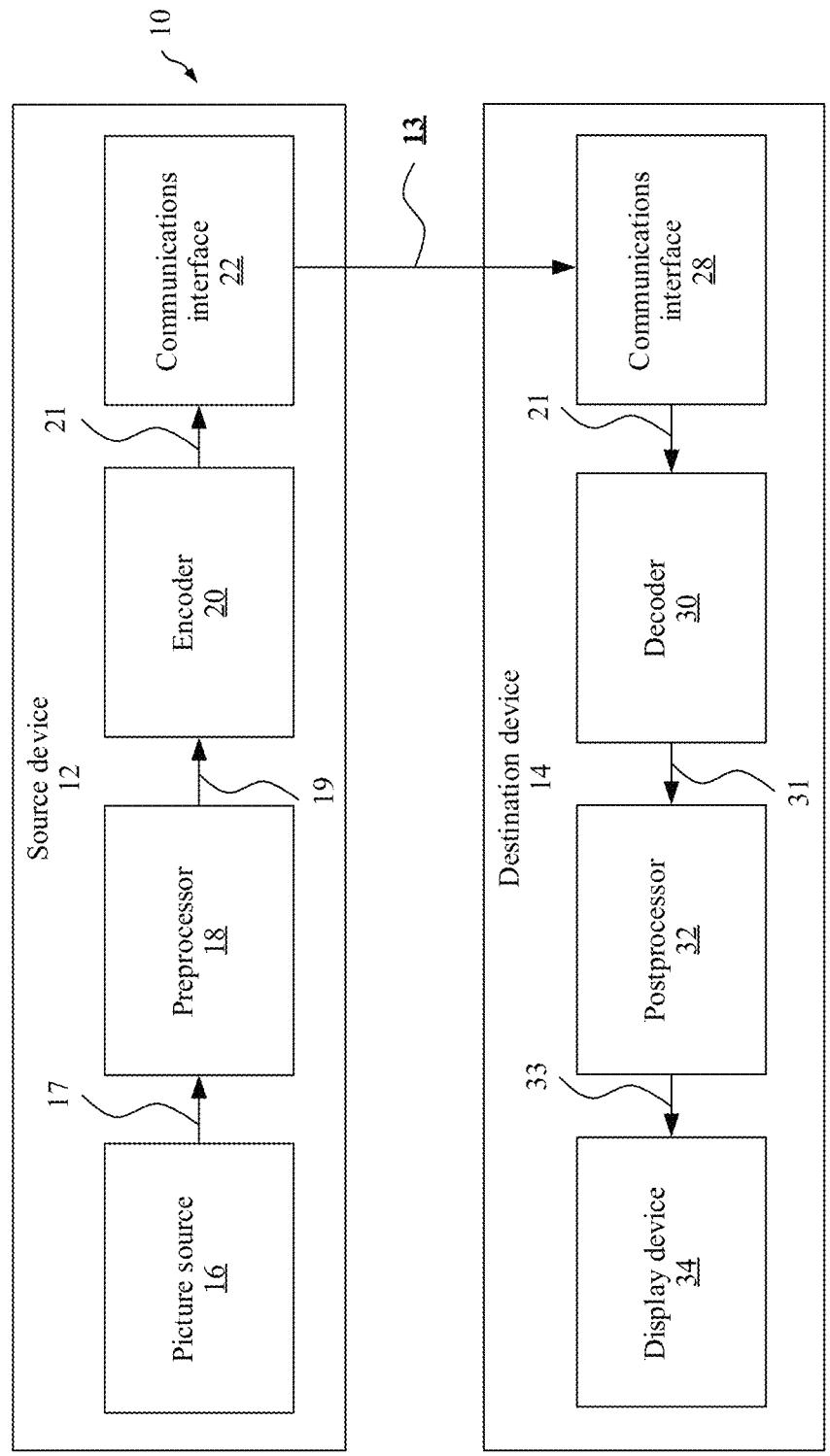
FIG. 1 is a block diagram illustrating an example of a video encoding system for implementing an embodiment of this application.

To make objectives, technical solutions, and advantages of this application clearer, the following further describes implementations of this application in detail with reference to accompanying drawings.

To facilitate understanding of this application, the following first describes a system architecture and concepts of terms of this application.

Video coding is usually processing a sequence of pictures that form a video or a video sequence. In the field of video coding, the terms "picture", "frame", and "image" may be used as synonyms. Video coding used in this application (or this disclosure) indicates video encoding or video decoding. Video encoding is performed on a source side, and usually includes processing (for example, through compression) an original video picture to reduce an amount of data required for representing the video picture (for more efficient storage and/or transmission). Video decoding is performed on a destination side, and usually includes inverse processing relative to an encoder to reconstruct a video picture. "Encoding" of a video picture in the embodiments should be understood as "encoding" or "decoding" related to a video sequence. A combination of encoding and decoding is also referred to as coding (encoding and decoding).

Each picture in a video sequence is usually partitioned into a set of non-overlapping blocks, and coding is usually performed at a block level. To be specific, on an encoder side, a video is usually processed, that is, encoded, at a block (which is also referred to as a picture block or a video block) level. For example, a prediction block is generated through spatial (intra-picture) prediction and temporal (inter-picture) prediction, the prediction block is subtracted from a current block (a block being processed or to be processed) to obtain a residual block, and the residual block is transformed in transform domain and quantized to reduce an amount of data that is to be transmitted (compressed). On a decoder side, inverse processing relative to the encoder is applied to the encoded or compressed block to reconstruct the current block for representation. In addition, the encoder duplicates a processing loop of the decoder, so that the encoder and the decoder generate same prediction (for example, intra prediction and inter prediction) and/or reconstruction for processing, that is, encoding a subsequent block.

The term "block" may be a part of a picture or a frame. Key terms in this application are defined as follows:

Current block: The current block is a block that is being processed. For example, during encoding, the current block is a block that is being encoded, and during decoding, the current block is a block that is being decoded. If the block that is being processed is a chroma component block, the block is referred to as a current chroma block. A luma block corresponding to the current chroma block may be referred to as a current luma block.

Reference block: The reference block is a block that provides a reference signal for a current block. In a search process, a plurality of reference blocks may be traversed to find an optimal reference block.

Prediction block: A block that provides prediction for a current block is referred to as a prediction block. For example, after a plurality of reference blocks are traversed, an optimal reference block is found. The optimal reference block provides prediction for the current block, and the block is referred to as a prediction block.

Picture block signal: The picture block signal is a sample value, a sampling value, or a sampling signal in a picture block.

Prediction signal: A sample value, a sampling value, or a sampling signal in a prediction block is referred to as a prediction signal.

The following describes embodiments of an encoder 20, a decoder 30, and an encoding system 10 based on FIG. 1 and FIG. 2 to FIG. 4.

FIG. 1 is a conceptual or schematic block diagram illustrating an example encoding system 10, for example, a video encoding system 10 that may use the technology of this application (this disclosure). An encoder 20 (for example, a video encoder 20) and a decoder 30 (for example, a video decoder 30) in the video encoding system 10 represent device examples that may be configured to perform intra prediction according to various examples described in this application. As shown in FIG. 1, the encoding system 10 includes a source device 12 configured to provide encoded data 13 such as an encoded picture 13 to a destination device 14 for decoding the encoded data 13, or the like.

The source device 12 includes the encoder 20, and additionally or optionally, may include a picture source 16, for example, a preprocessing unit 18 such as a picture preprocessing unit 18, and a communications interface or communications unit 22.

The picture source 16 may include or may be any type of picture capturing device configured to capture a real-world picture and the like, and/or any type of device for generating a picture or comment (for screen content encoding, some text on a screen is also considered as a part of a to-be-encoded picture or picture), for example, a computer graphics processing unit configured to generate a computer animation picture, or any type of device configured to obtain and/or provide a real-world picture or a computer animation picture (for example, screen content or a virtual reality (VR) picture), and/or any combination thereof (for example, an augmented reality (AR) picture).

A picture may be considered as a two-dimensional array or matrix of samples with luma values. The sample in the array may also be referred to as a pixel (a short form of a picture element (picture element)) or a pel. A quantity of samples in horizontal and vertical directions (or axes) of the array or the picture defines a size and/or a resolution of the picture. For representation of color, three color components are usually used, that is, the picture may be represented as or include three sample arrays. In RBG format or color space, a picture includes corresponding red, green, and blue sample arrays. However, in video coding, each sample is usually represented in a luminance/chrominance format or color space, for example, a picture in YCbCr format includes a luminance component indicated by Y (sometimes indicated by L) and two chrominance components indicated by Cb and Cr. The luminance (luma) component Y indicates luminance or gray level intensity (for example, the two are the same in a gray-scale picture), and the two chrominance (chroma) components Cb and Cr represent chrominance or color information components. Accordingly, the picture in YCbCr format includes a luminance sample array of luminance sample values (Y), and two chrominance sample arrays of chrominance values (Cb and Cr). A picture in RGB format may be converted or transformed into a picture in YCbCr format, and vice versa. This process is also referred to as color transformation or conversion. If a picture is monochrome, the picture may include only a luminance sample array.

The picture source 16 (for example, a video source 16) may be, for example, a camera configured to capture a picture, for example, a memory such as a picture memory, which includes or stores a previously captured or generated picture, and/or any type of (internal or external) interface for obtaining or receiving a picture. The camera may be, for example, a local camera or an integrated camera integrated into the source device, and the memory may be a local memory or an integrated memory integrated into the source device. The interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface according to any proprietary or standardized interface protocol, for example, a wired or wireless interface or an optical interface. The interface for obtaining picture data 17 may be an interface the same as the communications interface 22, or may be a part of the communications interface 22.

Different from the preprocessing unit 18 and processing performed by the preprocessing unit 18, the picture 17 or the picture data 17 (for example, video data 16) may also be referred to as an original picture 17 or original picture data 17.

The preprocessing unit 18 is configured to receive the (original) picture data 17 and perform preprocessing on the picture data 17, to obtain a preprocessed picture 19 or preprocessed picture data 19. For example, the preprocessing performed by the preprocessing unit 18 may include trimming, color format conversion (for example, from RGB to YCbCr), color correction, or noise reduction. It may be understood that the preprocessing unit 18 may be an optional component.

The encoder 20 (for example, the video encoder 20) is configured to receive the preprocessed picture data 19 and provide encoded picture data 21 (details are further described below, for example, based on FIG. 3 or FIG. 5). In an example, the encoder 20 may be configured to perform the following embodiments 1 to 7.

The communications interface 22 of the source device 12 may be configured to receive the encoded picture data 21 and transmit the encoded picture data 21 to another device, for example, the destination device 14 or any another device, for storage or direct reconstruction, or may be configured to process the encoded picture data 21 before correspondingly storing the encoded data 13 and/or transmitting the encoded data 13 to another device. The another device is, for example, the destination device 14 or any other device used for decoding or storage.

The destination device 14 includes the decoder 30 (for example, the video decoder 30), and additionally or optionally, may include a communications interface or communications unit 28, a postprocessing unit 32, and a display device 34.

For example, the communications interface 28 of the destination device 14 is configured to directly receive the encoded picture data 21 or the encoded data 13 from the source device 12 or any other source. The any other source is, for example, a storage device, and the storage device is, for example, an encoded picture data storage device.

The communications interface 22 and the communications interface 28 may be configured to transmit or receive the encoded picture data 21 or the encoded data 13 over a direct communications link between the source device 12 and the destination device 14 or over any type of network. The direct communications link is, for example, a direct wired or wireless connection, and the any type of network is, for example, a wired or wireless network or any combination thereof, or any type of private network or public network or any combination thereof.

The communications interface 22 may be, for example, configured to encapsulate the encoded picture data 21 into a proper format such as a packet for transmission over a communications link or a communications network.

The communications interface 28 as a corresponding part of the communications interface 22 may be configured to decapsulate the encoded data 13 to obtain the encoded picture data 21, and the like.

Both the communications interface 22 and the communications interface 28 may be configured as unidirectional communications interfaces, for example, an arrow pointing from the source device 12 to the destination device 14 that are used for the encoded picture data 21 in FIG. 1, or may be configured as bidirectional communications interfaces, and may be, for example, configured to send and receive a message to establish a connection, and confirm and exchange any other information related to a communications link and/or data transmission such as encoded picture data transmission.

The decoder 30 is configured to receive the encoded picture data 21 and provide decoded picture data 31 or a decoded picture 31 (details are further described below, for example, based on FIG. 4 or FIG. 6). In an example, the decoder 30 may be configured to perform the following embodiments 1 to 7.

The postprocessing unit 32 of the destination device 14 is configured to postprocess the decoded picture data 31 (also referred to as reconstructed picture data) such as the decoded picture 31, to obtain postprocessed picture data 33 such as a postprocessed picture 33. The postprocessing performed by the postprocessing unit 32 may include, for example, color format conversion (for example, from YCbCr to RGB), color correction, trimming, resampling, or any other processing to prepare the decoded picture data 31 for display by the display device 34.

The display device 34 of the destination device 14 is configured to receive the postprocessed picture data 33 to display the picture to a user, a viewer, or the like. The display device 34 may be or may include any type of display configured to present a reconstructed picture, for example, an integrated or external display or monitor. For example, the display may include a liquid crystal display (LCD), an organic light-emitting diode (OLED) display, a plasma display, a projector, a micro-LED display, a liquid crystal on silicon (LCoS) display, a digital light processor (DLP), or any other type of display.

Although FIG. 1 depicts the source device 12 and the destination device 14 as separate devices, device embodiments may also include both the source device 12 and the destination device 14 or both a function of the source device 12 and a function of the destination device 14, that is, the source device 12 or the corresponding function and the destination device 14 or the corresponding function. In such embodiments, the source device 12 or the corresponding function and the destination device 14 or the corresponding function may be implemented by using same hardware and/or software, separate hardware and/or software, or any combination thereof.

Based on the descriptions, a person skilled in the art easily understands that existence and (accurate) division of functions of different units or functions/a function of the source device 12 and/or the destination device 14 shown in FIG. 1 may vary with an actual device and application.

The encoder 20 (for example, the video encoder 20) and the decoder 30 (for example, the video decoder 30) each may be implemented as any one of various proper circuits, for example, one or more microprocessors, a digital signal processor (DSP), an application-specific integrated circuit (ASIC), a field-programmable gate array (FPGA), discrete logic, hardware, or any combination thereof. If the technology is partially implemented in software, the device may store a software instruction in a proper non-transitory computer readable storage medium, and may execute the instruction in hardware by using one or more processors to perform the technologies in this disclosure. Any of the foregoing content (including hardware, software, a combination of hardware and software, and the like) may be considered as one or more processors. The video encoder 20 and the video decoder 30 each may be included in one or more encoders or decoders, and any one of the encoders or the decoders may be integrated as a part of a combined encoder/decoder (a codec) in a corresponding device.

The source device 12 may be referred to as a video encoding device or a video encoding apparatus. The destination device 14 may be referred to as a video decoding device or a video decoding apparatus. The source device 12 and the destination device 14 each may be an example of a video encoding device or a video decoding apparatus.

The source device 12 and the destination device 14 each may include any one of various devices, including any type of handheld or stationary device, for example, a notebook or laptop computer, a mobile phone, a smart phone, a tablet or a tablet computer, a video camera, a desktop computer, a set-top box, a television, a display device, a digital media player, a video game console, a video streaming transmission device (such as a content service server or a content distribution server), a broadcast receiver device, or a broadcast transmitter device, and may use or may not use any type of operating system.

In some cases, the source device 12 and the destination device 14 may be equipped for wireless communication. Therefore, the source device 12 and the destination device 14 may be wireless communications devices.

In some cases, the video encoding system 10 shown in FIG. 1 is merely an example, and the technologies in this application may be applied to a video coding setting (for example, video encoding or video decoding) that does not need to include any data communication between an encoding device and a decoding device. In other examples, data may be retrieved from a local memory, streamed over a network, or the like. A video encoding device may encode data and store the data in a memory, and/or a video decoding device may retrieve the data from the memory and decode the data. In some examples, encoding and decoding are performed by devices that do not communicate with each other but only encode data to a memory and/or retrieve the data from the memory and decode the data.

It should be understood that, for each of the foregoing examples described with reference to the video encoder 20, the video decoder 30 may be configured to perform an inverse process. For a signaling syntax element, the video decoder 30 may be configured to receive and parse the syntax element and decode related video data accordingly. In some examples, the video encoder 20 may entropy-encode a syntax element into an encoded video bitstream. In such examples, the video decoder 30 may parse the syntax element and decode related video data accordingly.

Figure 2:
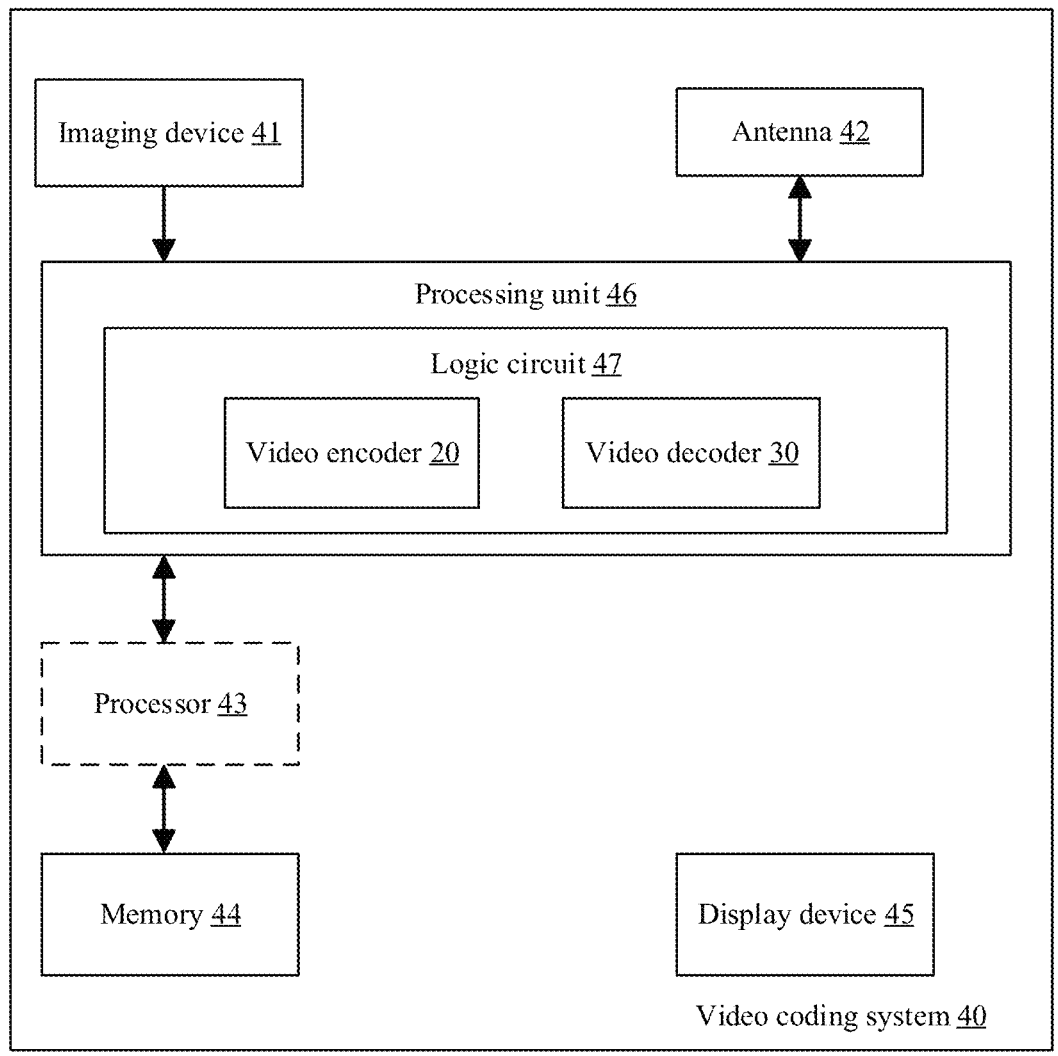
FIG. 2 is a block diagram of an example of a video coding system including any one or two of the encoder 20 in FIG. 3 and the decoder 30 in FIG. 4.
Figure 3:
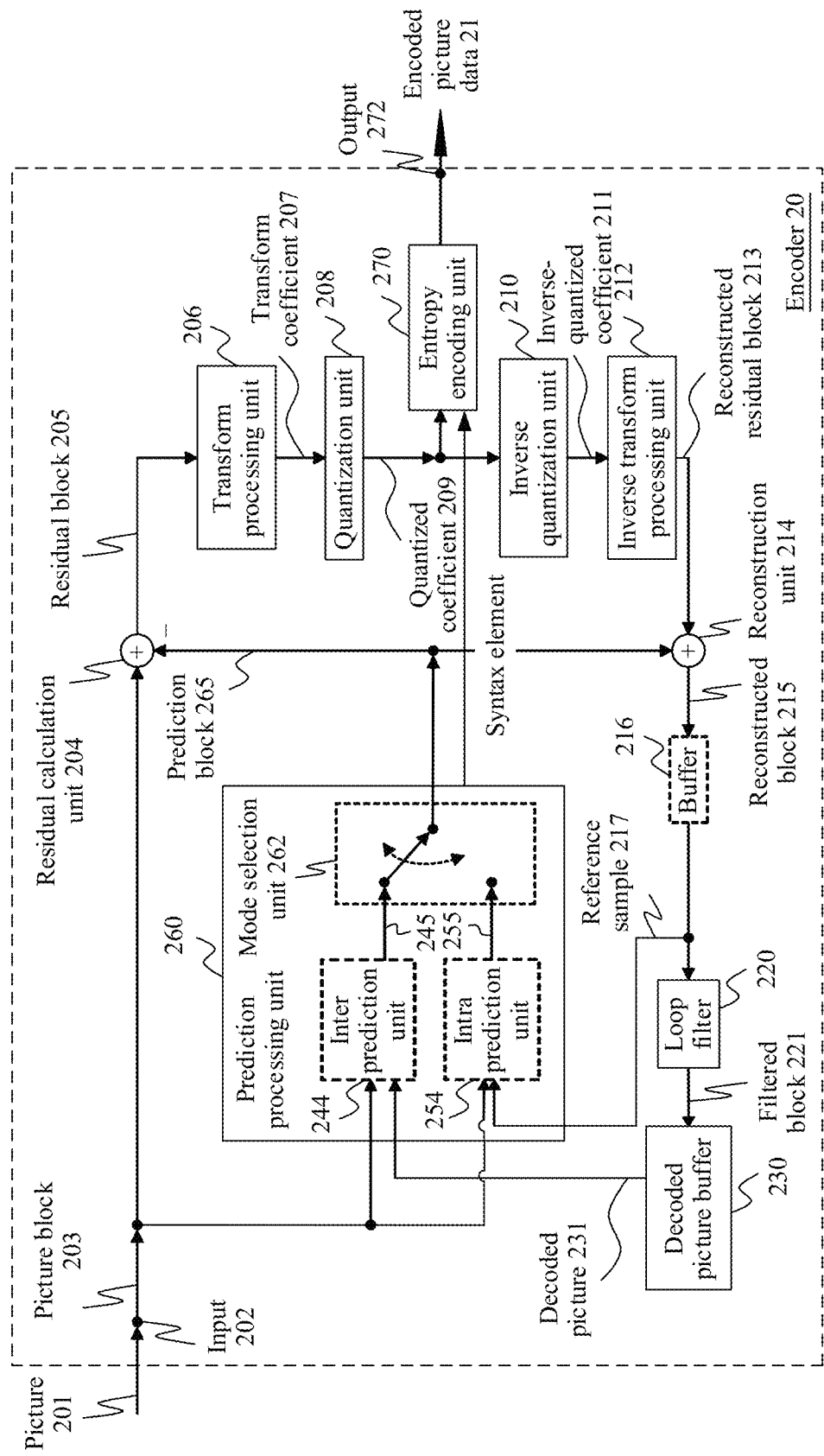
FIG. 3 is a block diagram illustrating an example structure of a video encoder for implementing an embodiment of this application.
Figure 4:
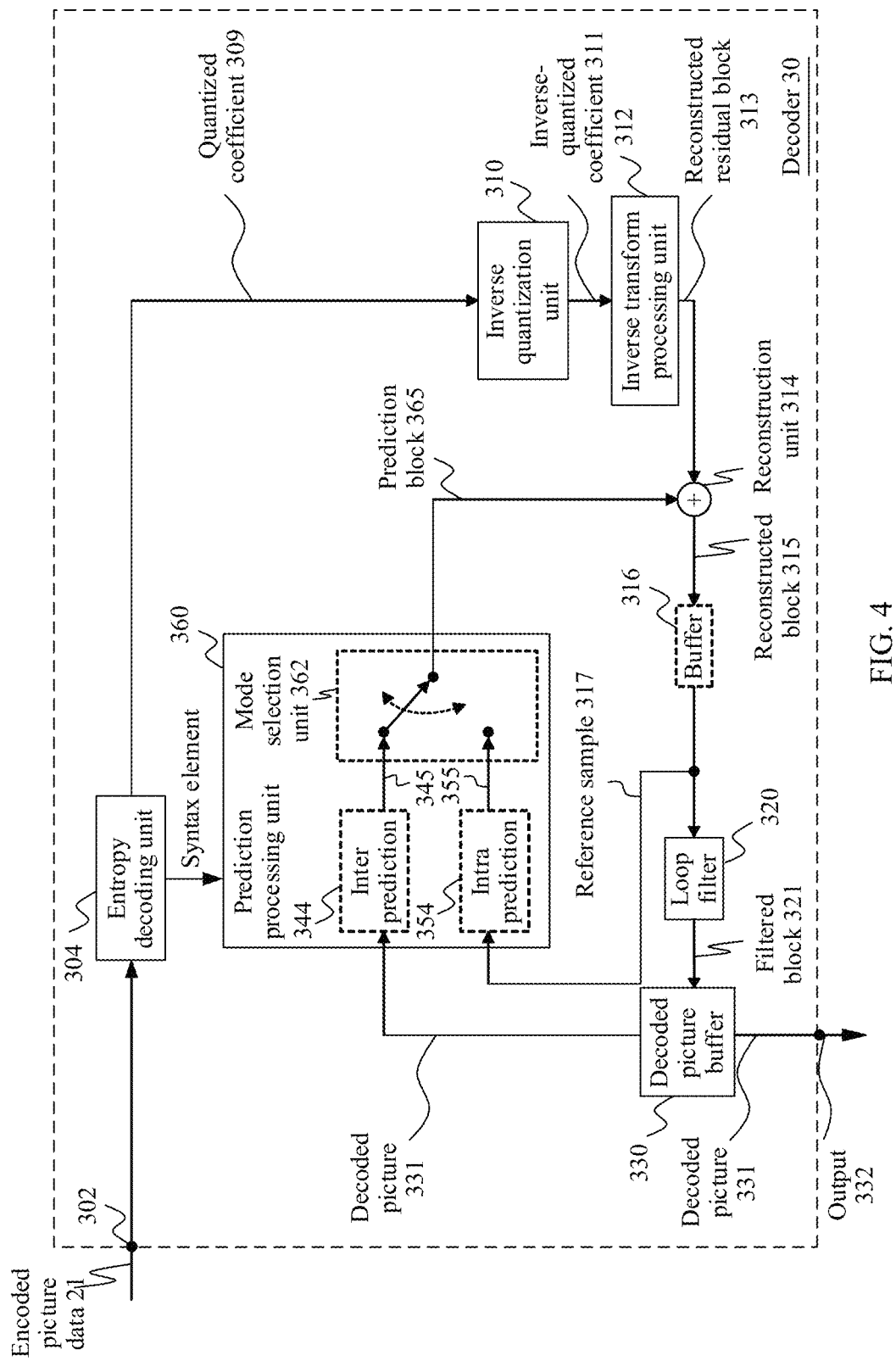
FIG. 4 is a block diagram illustrating an example structure of a video decoder for implementing an embodiment of this application.

FIG. 2 is a diagram illustrating an example of a video coding system 40 including the encoder 20 in FIG. 3 and/or the decoder 30 in FIG. 4 according to an example embodiment. The system 40 may implement a combination of various technologies of this application. In the illustrated implementation, the video coding system 40 may include an imaging device 41, the video encoder 20, the video decoder 30 (and/or a video decoder implemented by a logic circuit 47 of a processing unit 46), an antenna 42, one or more processors 43, one or more memories 44, and/or a display device 45.

As shown in FIG. 2, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated with both the video encoder 20 and the video decoder 30, in different examples, the video coding system 40 may include only the video encoder 20 or only the video decoder 30.

In some examples, as shown in FIG. 2, the video coding system 40 may include the antenna 42. For example, the antenna 42 may be configured to transmit or receive an encoded bitstream of video data. In addition, in some examples, the video coding system 40 may include the display device 45. The display device 45 may be configured to present the video data. In some examples, as shown in FIG. 2, the logic circuit 47 may be implemented by the processing unit 46. The processing unit 46 may include application-specific integrated circuit (ASIC) logic, a graphics processing unit, a general purpose processor, or the like. The video coding system 40 may also include the optional processor 43. The optional processor 43 may similarly include application-specific integrated circuit logic, a graphics processing unit, a general purpose processor, or the like. In some examples, the logic circuit 47 may be implemented by hardware such as video encoding dedicated hardware, and the processor 43 may be implemented by universal software, an operating system, or the like. In addition, the memory 44 may be any type of memory, for example, a volatile memory (for example, a static random access memory (SRAM) or a dynamic random access memory (DRAM)) or a non-volatile memory (for example, a flash memory). In a non-limitative example, the memory 44 may be implemented by a cache memory. In some examples, the logic circuit 47 may access the memory 44 (for example, to implement a picture buffer). In other examples, the logic circuit 47 and/or the processing unit 46 may include a memory (for example, a cache) to implement a picture buffer or the like.

In some examples, the video encoder 20 implemented by the logic circuit may include a picture buffer (for example, implemented by the processing unit 46 or the memory 44) and a graphics processing unit (for example, implemented by the processing unit 46). The graphics processing unit may be communicatively coupled to the picture buffer. The graphics processing unit may include the video encoder 20 implemented by the logic circuit 47, to implement various modules that are described with reference to FIG. 2 and/or any other encoder system or subsystem described in this specification. The logic circuit may be configured to perform various operations described in this specification.

The video decoder 30 may be similarly implemented by the logic circuit 47, to implement various modules that are described with reference to the decoder 30 in FIG. 4 and/or any other decoder system or subsystem described in this specification. In some examples, the video decoder 30 implemented by the logic circuit may include a picture buffer (implemented by the processing unit 46 or the memory 44) and a graphics processing unit (for example, implemented by the processing unit 46). The graphics processing unit may be communicatively coupled to the picture buffer. The graphics processing unit may include the video decoder 30 implemented by the logic circuit 47, to implement various modules that are described with reference to FIG. 4 and/or any other decoder system or subsystem described in this specification.

In some examples, the antenna 42 of the video coding system 40 may be configured to receive an encoded bitstream of video data. As described, the encoded bitstream may include data, an indicator, an index value, mode selection data, or the like that is related to video frame encoding described in this specification, for example, data related to encoding partitioning (for example, a transform coefficient or a quantized transform coefficient, an optional indicator (as described), and/or data defining encoding partitioning). The video coding system 40 may further include the video decoder 30 that is coupled to the antenna 42 and that is configured to decode the encoded bitstream. The display device 45 is configured to present a video frame.

Encoder & Encoding Method

FIG. 3 is a schematic/conceptual block diagram of an example of a video encoder 20 configured to implement the technologies in this application (disclosure). In the example in FIG. 3, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 20 shown in FIG. 3 may also be referred to as a hybrid video encoder or a hybrid video codec-based video encoder.

For example, the residual calculation unit 204, the transform processing unit 206, the quantization unit 208, the prediction processing unit 260, and the entropy encoding unit 270 form a forward signal path of the encoder 20, and the inverse quantization unit 210, the inverse transform processing unit 212, the reconstruction unit 214, the buffer 216, the loop filter 220, the decoded picture buffer 230, the prediction processing unit 260, and the like form a backward signal path of the encoder. The backward signal path of the encoder corresponds to a signal path of a decoder (referring to a decoder 30 in FIG. 4).

The encoder 20 receives a picture 201 or a block 203 of the picture 201 by using an input 202 or the like, for example, a picture in a sequence of pictures that form a video or a video sequence. The picture block 203 may also be referred to as a current picture block or a to-be-encoded picture block, and the picture 201 may be referred to as a current picture or a to-be-encoded picture (especially when the current picture is distinguished from another picture in video coding, other pictures, for example, in a same video sequence, also include previously encoded and/or decoded pictures in the video sequence of the current picture).

Partitioning

The embodiment of the encoder 20 may include a partitioning unit (not shown in FIG. 3), configured to partition the picture 201 into a plurality of non-overlapping blocks such as blocks 203. The partitioning unit may be configured to use a same block size for all pictures in the video sequence and a corresponding raster defining the block size, or may be configured to: change a block size between pictures, subsets, or picture groups, and partition each picture into corresponding blocks.

In one example, the prediction processing unit 260 of the video encoder 20 may be configured to perform any combination of the foregoing partitioning technologies.

For example, in the picture 201, the block 203 is also or may be also considered as a two-dimensional array or matrix of samples with luminance values (sample values), although a size of the block 203 is smaller than that of the picture 201. In other words, the block 203 may include, for example, one sample array (for example, a luminance array in a case of a monochrome picture 201), three sample arrays (for example, one luminance array and two chrominance arrays in a case of a color picture), or any other quantity and/or type of arrays based on a used color format. A quantity of samples in horizontal and vertical directions (or axes) of the block 203 defines the size of the block 203.

The encoder 20 shown in FIG. 3 is configured to encode the picture 201 block by block, for example, perform encoding and prediction on each block 203.

Residual Calculation

The residual calculation unit 204 is configured to calculate a residual block 205 based on the picture block 203 and a prediction block 265 (further details about the prediction block 265 are provided below), for example, obtain the residual block 205 in a sample domain by subtracting a sample value of the prediction block 265 from a sample value of the picture block 203 sample by sample.

Transform

The transform processing unit 206 is configured to apply transform such as discrete cosine transform (DCT) or discrete sine transform (DST) to a sample value of the residual block 205, to obtain a transform coefficient 207 in a transform domain. The transform coefficient 207 may also be referred to as a residual transform coefficient, and indicates the residual block 205 in the transform domain.

The transform processing unit 206 may be configured to apply integer approximation of DCT/DST, for example, transform specified in HEVC/H.265. This integer approximation is usually scaled proportionally by a factor compared with orthogonal DCT transform. To maintain the norm of a residual block obtained through forward transform and inverse transform, an additional scale factor is applied as a part of the transform process. The scale factor is usually selected based on some constraint conditions, for example, is a power of 2, a bit depth of a transform coefficient, or trade-off between accuracy and implementation costs that is used for a shift operation. For example, a specific scale factor is specified for inverse transform on a decoder 30 side by using the inverse transform processing unit 212 (and correspondingly, for inverse transform on an encoder 20 side by using the inverse transform processing unit 212 or the like), and correspondingly, a corresponding scale factor may be specified for forward transform on an encoder 20 side by using the transform processing unit 206.

Quantization

The quantization unit 208 is configured to quantize the transform coefficient 207 by applying scale quantization, vector quantization, or the like, to obtain a quantized transform coefficient 209. The quantized transform coefficient 209 may also be referred to as a quantized residual coefficient 209. The quantization process may reduce a bit depth related to some or all transform coefficients 207. For example, an n-bit transform coefficient may be rounded down to an m-bit transform coefficient during quantization, where n is greater than m. A quantization degree may be modified by adjusting a quantization parameter (QP). For example, for scale quantization, different scales may be applied to achieve finer or coarser quantization. A smaller quantization step corresponds to finer quantization, and a larger quantization step corresponds to coarser quantization. A proper quantization step may be indicated by using a quantization parameter. For example, the quantization parameter may be an index of a predefined set of proper quantization steps. For example, a smaller quantization parameter may correspond to finer quantization (a smaller quantization step) and a larger quantization parameter may correspond to coarser quantization (a larger quantization step), and vice versa. The quantization may include division by a quantization step and corresponding quantization or inverse quantization performed by the inverse quantization unit 210 or the like, or may include multiplication by a quantization step. In embodiments according to some standards such as HEVC, a quantization parameter may be used to determine a quantization step. Generally, the quantization step may be calculated based on the quantization parameter through fixed point approximation of an equation including division. Additional scale factors may be introduced for quantization and inverse quantization, to restore the norm that is of a residual block and that may be modified because of a scale used in the fixed point approximation of the equation used for the quantization step and the quantization parameter. In an example implementation, a scale of inverse transform may be combined with a scale of inverse quantization. Alternatively, a customized quantization table may be used and signaled from an encoder to a decoder, for example, in a bitstream. The quantization is a lossy operation, and a larger quantization step indicates a larger loss.

The inverse quantization unit 210 is configured to apply inverse quantization of the quantization unit 208 to a quantized coefficient to obtain an inverse-quantized coefficient 211, for example, apply, based on or by using a same quantization step as the quantization unit 208, an inverse quantization scheme of the quantization scheme applied by the quantization unit 208. The inverse-quantized coefficient 211 may also be referred to as an inverse-quantized residual coefficient 211, and correspond to the transform coefficient 207, although a loss caused by quantization is usually different from the transform coefficient.

The inverse transform processing unit 212 is configured to apply inverse transform of the transform applied by the transform processing unit 206, for example, inverse discrete cosine transform or inverse discrete sine transform, to obtain an inverse transform block 213 in a sample domain. The inverse transform block 213 may also be referred to as an inverse transform inverse-quantized block 213 or an inverse transform residual block 213.

The reconstruction unit 214 (for example, a summator 214) is configured to add the inverse transform block 213 (that is, a reconstructed residual block 213) to the prediction block 265 to obtain a reconstructed block 215 in the sample domain, for example, by adding a sample value of the reconstructed residual block 213 and a sample value of the prediction block 265.

In an embodiment, the buffer unit 216 (or the "buffer" 216) such as a line buffer 216 is configured to buffer or store the reconstructed block 215 and a corresponding sample value for intra prediction and the like. In other embodiments, an encoder may be configured to use an unfiltered reconstructed block and/or a corresponding sample value that are/is stored in the buffer unit 216 for any type of estimation and/or prediction such as intra prediction.

For example, the embodiment of the encoder 20 may be configured, so that the buffer unit 216 is not only configured to store the reconstructed block 215 for intra prediction, but also configured to store the filtered block 221 of the loop filter unit 220 (not shown in FIG. 3), and/or the buffer unit 216 and the decoded picture buffer unit 230 form one buffer. Other embodiments may be used to use a filtered block 221 and/or a block or a sample from the decoded picture buffer 230 (not shown in FIG. 3) as an input or a basis for intra prediction.

The loop filter unit 220 (or the "loop filter" 220) is configured to perform filtering on the reconstructed block 215 to obtain the filtered block 221, so as to smoothly perform sample transformation or improve video quality. The loop filter unit 220 is intended to represent one or more loop filters, for example, a deblocking filter, a sample-adaptive offset (SAO) filter, or another filter such as a bilateral filter, an adaptive loop filter (ALF), a sharpening or smoothing filter, or a cooperative filter. Although the loop filter unit 220 is shown in FIG. 3 as an in-loop filter, the loop filter unit 220 may be implemented as a post-loop filter in other configurations. The filtered block 221 may also be referred to as a filtered reconstructed block 221. The decoded picture buffer 230 may store the reconstructed coding block after the loop filter unit 220 performs a filtering operation on the reconstructed coding block.

The embodiment of the encoder 20 (correspondingly, the loop filter unit 220) may be used to output a loop filter parameter (for example, sample adaptive offset information), for example, directly output a loop filter parameter or output a loop filter parameter after the entropy encoding unit 270 or any other entropy encoding unit performs entropy encoding, so that the decoder 30 can receive and apply a same loop filter parameter for decoding, and the like.

The decoded picture buffer 230 may be a reference picture memory that stores reference picture data for the video encoder 20 to encode video data. The DPB 230 may be any one of a plurality of memories, for example, a dynamic random access memory (DRAM) (including a synchronous DRAM (SDRAM), a magnetoresistive RAM (MRAM), or a resistive RAM (RRAM)), or another type of memory. The DPB 230 and the buffer 216 may be provided by a same memory or separate memories. In an example, the decoded picture buffer (DPB) 230 is configured to store the filtered block 221. The decoded picture buffer 230 may be further configured to store other previous filtered blocks such as previous reconstructed and filtered blocks 221 of a same current picture or different pictures such as previous reconstructed pictures, and may provide a complete previous reconstructed, that is, decoded picture (and a corresponding reference block and a corresponding sample) and/or a partially reconstructed current picture (and a corresponding reference block and a corresponding sample) for inter prediction and the like. In an example, if the reconstructed block 215 is reconstructed without in-loop filtering, the decoded picture buffer 230 is configured to store the reconstructed block 215.

The prediction processing unit 260 is also referred to as a block prediction processing unit 260, and is configured to: receive or obtain the block 203 (the current block 203 of the current picture 201) and reconstructed picture data, for example, a reference sample from a same (current) picture in the buffer 216 and/or reference picture data 231 from one or more previous decoded pictures in the decoded picture buffer 230, and process such data for prediction, that is, provide a prediction block 265 that may be an inter prediction block 245 or an intra prediction block 255.

The mode selection unit 262 may be configured to select a prediction mode (for example, an intra or inter prediction mode) and/or a corresponding prediction block 245 or 255 as the prediction block 265, to calculate the residual block 205 and reconstruct the reconstructed block 215.

The embodiment of the mode selection unit 262 may be used to select a prediction mode (for example, from prediction modes supported by the prediction processing unit 260). The prediction mode provides a best match or a minimum residual (the minimum residual means better compression in transmission or storage), or provides minimum signaling overheads (the minimum signaling overheads mean better compression in transmission or storage), or considers or balances the two. The mode selection unit 262 may be configured to determine a prediction mode based on rate distortion optimization (RDO), that is, select a prediction mode that provides minimum rate distortion optimization, or select a prediction mode in which related rate distortion at least meets a prediction mode selection criterion.

The prediction processing (for example, by using the prediction processing unit 260) and the mode selection (for example, by using the mode selection unit 262) performed by an example of the encoder 20 are described in detail below.

As described above, the encoder 20 is configured to determine or select a best or optimal prediction mode from a (predetermined) prediction mode set. The prediction mode set may include, for example, an intra prediction mode and/or an inter prediction mode.

The intra prediction mode set may include 35 different intra prediction modes, or may include 67 different intra prediction modes, or may include developing intra prediction modes defined in H.266.

The inter prediction mode set depends on an available reference picture (for example, at least a part of the decoded picture stored in the DPB 230) and other inter prediction parameters, for example, depends on whether the entire reference picture is used or only a part of the reference picture is used, for example, a search window region surrounding a region of a current block is searched for a best matched reference block, and/or depends on whether sample interpolation such as half-sample and/or quarter-sample interpolation is applied.

In addition to the foregoing prediction modes, a skip mode and/or a direct mode may also be applied.

The prediction processing unit 260 may be further configured to: partition the block 203 into smaller block partitions or subblocks, for example, by iteratively using quadtree (QT) partitioning, binary-tree (BT) partitioning, triple-tree (TT) partitioning, or any combination thereof, and perform prediction and the like on each of the block partitions or the subblocks. The mode selection includes selecting a tree structure of the partitioned block 203 and selecting a prediction mode applied to each of the block partitions or the subblocks.

The inter prediction unit 244 may include a motion estimation (ME) unit (not shown in FIG. 3) and a motion compensation (MC) unit (not shown in FIG. 3). The motion estimation unit is configured to receive or obtain the picture block 203 (the current picture block 203 of the current picture 201) and the decoded picture 31, or at least one or more previous reconstructed blocks, for example, one or more other reconstructed blocks different from the previous decoded picture 31, to perform motion estimation. For example, a video sequence may include the current picture and the previous decoded picture 31. In other words, the current picture and the previous decoded picture 31 may be a part of a sequence of pictures that form the video sequence, or form the picture sequence.

For example, the encoder 20 may be configured to: select a reference block from a plurality of reference blocks of a same picture or different pictures in a plurality of other pictures, and provide a reference picture and/or an offset (a spatial offset) between a location (X-Y coordinates) of the reference block and a location of the current block as an inter prediction parameter to the motion estimation unit (not shown in FIG. 3). This offset is also referred to as a motion vector (MV).

The motion compensation unit is configured to: obtain, for example, receive an inter prediction parameter, and perform inter prediction based on or by using the inter prediction parameter to obtain the inter prediction block 245. The motion compensation performed by the motion compensation unit (not shown in FIG. 3) may include fetching or generating the prediction block based on a motion/block vector determined through motion estimation (possibly performing interpolation on sub-sample precision). During interpolation filtering, an additional sample may be generated from known samples, thereby potentially increasing a quantity of candidate prediction blocks that may be used to encode a picture block. Once a motion vector used for a PU of a current picture block is received, the motion compensation unit 246 may locate a prediction block to which the motion vector points in a reference picture list. The motion compensation unit 246 may further generate a syntax element associated with a block and a video slice, so that the video decoder 30 uses the syntax element when decoding a picture block of the video slice.

The intra prediction unit 254 is configured to obtain, for example, receive a picture block 203 (a current picture block) of the same picture and one or more previous reconstructed blocks such as reconstructed neighboring blocks, to perform intra estimation. For example, the encoder 20 may be configured to select an intra prediction mode from a plurality of intra prediction modes.

The embodiment of the encoder 20 may be configured to select an intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on an intra prediction parameter of the selected intra prediction mode. In any case, after selecting the intra prediction mode used for a block, the intra prediction unit 254 is further configured to provide the intra prediction parameter to the entropy encoding unit 270, that is, provide information for indicating the selected intra prediction mode used for a block. In an example, the intra prediction unit 254 may be configured to perform any combination of the following intra prediction technologies.

The entropy encoding unit 270 is configured to apply an entropy encoding algorithm or scheme (for example, a variable length coding (VLC) scheme, a context adaptive VLC (CAVLC) scheme, an arithmetic coding scheme, a context adaptive binary arithmetic coding (CABAC) scheme, a syntax-based context-adaptive binary arithmetic coding (SBAC) scheme, a probability interval partitioning entropy (PIPE) coding scheme, or another entropy encoding method or technology) to one or more (or none) of the quantized residual coefficient 209, the inter prediction parameter, the intra prediction parameter, and/or the loop filter parameter, to obtain the encoded picture data 21 that can be output by using an output 272, for example, in a form of an encoded bitstream. The encoded bitstream may be transmitted to the video decoder 30, or may be archived for later transmission or retrieval by the video decoder 30. The entropy encoding unit 270 may be further configured to perform entropy encoding on another syntax element of the current video slice that is being encoded.

Another structural variant of the video encoder 20 may be configured to encode a video stream. For example, the non-transform-based encoder 20 may directly quantize a residual signal without the transform processing unit 206 for some blocks or frames. In another implementation, the encoder 20 may have the quantization unit 208 and the inverse quantization unit 210 that are combined into one unit.

FIG. 4 shows an example of a video decoder 30, configured to implement the technologies in this application. The video decoder 30 is configured to receive encoded picture data (for example, an encoded bitstream) 21 encoded by the encoder 20 or the like, to obtain a decoded picture 31. In a decoding process, the video decoder 30 receives video data from the video encoder 20, for example, an encoded video bitstream that indicates a picture block of an encoded video slice and an associated syntax element.

In the example of FIG. 4, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform decoding traversal generally reciprocal to the encoding traversal described with reference to the video encoder 20 in FIG. 3.

The entropy decoding unit 304 is configured to perform entropy decoding on the encoded picture data 21, to obtain a quantized coefficient 309, a decoded encoding parameter (not shown in FIG. 4), and/or the like, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or the another syntax element to the prediction processing unit 360. The video decoder 30 may receive a syntax element at a video slice level and/or a syntax element at a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function same as the buffer 216, the loop filter 320 may have a same function as the loop filter 220, and the decoded picture buffer 330 may have a same function as the decoded picture buffer 230.

The prediction processing unit 360 may include the inter prediction unit 344 and the intra prediction unit 354. The inter prediction unit 344 may have a function similar to that of the inter prediction unit 244, and the intra prediction unit 354 may have a function similar to that of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 used for a picture block of the current video slice based on a signaled intra prediction mode and data from a previous decoded block of a current frame or picture. When a video frame is encoded as an inter-coded (that is, B or P) slice, the inter prediction unit 344 (for example, a motion compensation unit) of the prediction processing unit 360 is configured to generate the prediction block 365 used for a video block of the current video slice based on a motion vector and another syntax element received from the entropy decoding unit 304. For inter prediction, a prediction block may be generated from one of reference pictures in one reference picture list. The video decoder 30 may construct reference frame lists: a list 0 and a list 1 by using a default construction technology based on a reference picture stored in the DPB 330.

The prediction processing unit 360 is configured to: determine prediction information used for the video block of the current video slice by parsing the motion vector and the another syntax element, and use the prediction information to generate the prediction block used for the current video block that is being decoded. For example, the prediction processing unit 360 determines, by using some received syntax elements, a prediction mode (for example, intra or inter prediction) used to encode a video block of a video slice, an inter prediction slice type (for example, a B slice, a P slice, or a GPB slice), construction information of one or more of pictures in a reference picture list used for a slice, a motion vector of each inter-encoded video block used for a slice, an inter prediction state of each inter-encoded video block used for a slice, and other information, to decode the video block of the current video slice.

The inverse quantization unit 310 may be configured to perform inverse quantization (that is, dequantization) on a quantized transform coefficient provided in the bitstream and decoded by the entropy decoding unit 304. The inverse quantization process may include: using a quantization parameter calculated by the video encoder 20 for each video block in the video slice, to determine a quantization degree that should be applied and determine an inverse quantization degree that should be applied.

The inverse transform processing unit 312 is configured to apply inverse transform (for example, inverse DCT, inverse integer transform, or a conceptually similar inverse transform process) to the transform coefficient, to generate a residual block in a sample domain.

The reconstruction unit 314 (for example, the summator 314) is configured to add an inverse transform block 313 (that is, a reconstructed residual block 313) to the prediction block 365, to obtain a reconstructed block 315 in a sample domain, for example, by adding a sample value of the reconstructed residual block 313 to a sample value of the prediction block 365.

The loop filter unit 320 (in an encoding loop or after an encoding loop) is configured to filter the reconstructed block 315 to obtain a filtered block 321, so as to smoothly perform sample transformation or improve video quality. In an example, the loop filter unit 320 may be configured to perform any combination of the following filtering technologies. The loop filter unit 320 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown in FIG. 4 as an in-loop filter, the loop filter unit 320 may be implemented as a post-loop filter in other configurations.

The filtered block 321 in a given frame or picture is then stored in the decoded picture buffer 330 that stores a reference picture used for subsequent motion compensation.

The decoder 30 is configured to output the decoded picture 31 by using an output 332, and the like, to present the decoded picture 31 to the user or provide the decoded picture 31 for the user to view.

Another variation of the video decoder 30 may be configured to decode a compressed bitstream. For example, the decoder 30 may generate an output video stream without the loop filter unit 320. For example, the non-transform-based decoder 30 may directly dequantize a residual signal without the inverse transform processing unit 312 for some blocks or frames. In another implementation, the video decoder 30 may have the inverse quantization unit 310 and the inverse transform processing unit 312 that are combined into one unit.

Figure 5:
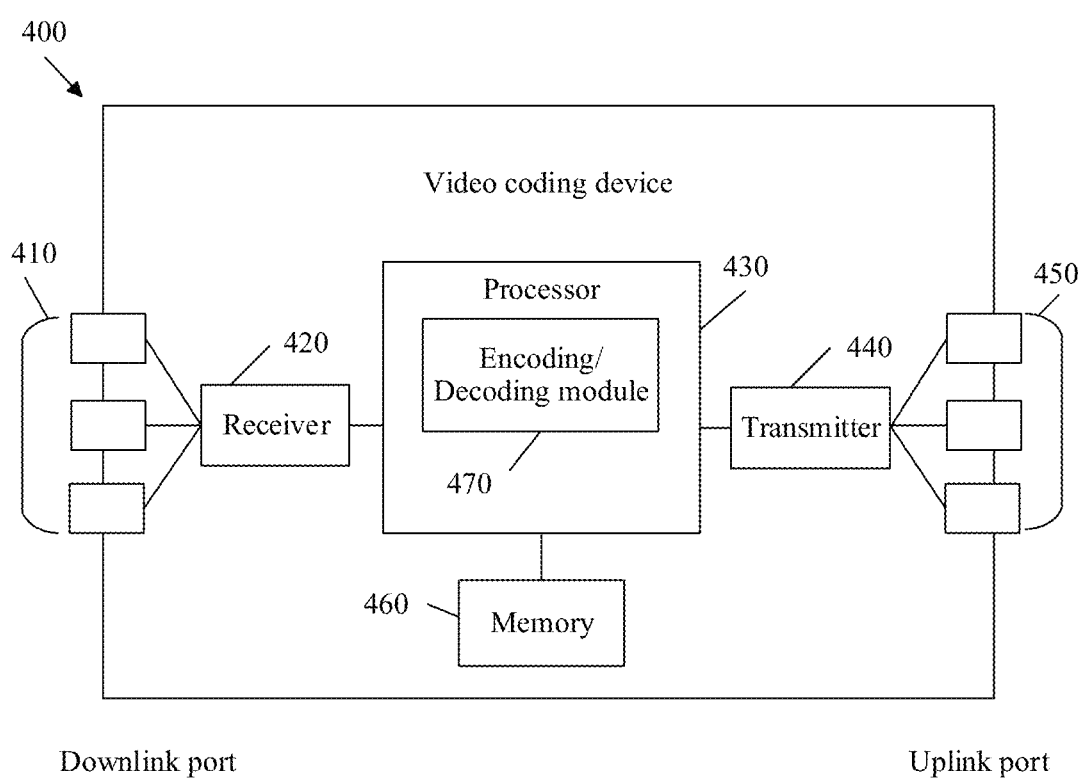
FIG. 5 is a block diagram illustrating an example of an encoding apparatus or a decoding apparatus.

FIG. 5 is a schematic structural diagram of a video coding device 400 (for example, a video encoding device 400 or a video decoding device 400) according to an embodiment of this application. The video coding device 400 is suitable for implementing an embodiment described in this specification. In an embodiment, the video coding device 400 may be a video decoder (for example, the video decoder 30 in FIG. 1) or a video encoder (for example, the video encoder 20 in FIG. 1). In another embodiment, the video coding device 400 may be one or more components in the video decoder 30 in FIG. 1 or the video encoder 20 in FIG. 1.

The video coding device 400 includes: an ingress port 410 and a receiver unit (Rx) 420 that are configured to receive data; a processor, a logic unit, or a central processing unit (CPU) 430 that is configured to process data; a transmitter unit (Tx) 440 and an egress port 450 that are configured to transmit data; and a memory 460 configured to store data. The video coding device 400 may further include an optical-to-electrical conversion component and an electrical-to-optical (EO) conversion component that are coupled to the ingress port 410, the receiver unit 420, the transmitter unit 440, and the egress port 450, to serve as an egress or an ingress of an optical signal or an electrical signal.

The processor 430 is implemented by using hardware and software. The processor 430 may be implemented as one or more CPU chips, cores (for example, a multi-core processor), FPGAs, ASICs, or DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the foregoing disclosed embodiments. For example, the encoding/decoding module 470 performs, processes, or provides various coding operations. Therefore, the encoding/decoding module 470 substantially expands functions of the video coding device 400 and affects conversion of the video coding device 400 into different states. Alternatively, the encoding/decoding module 470 is implemented by using an instruction stored in the memory 460 and executed by the processor 430.

The memory 460 includes one or more disks, tape drives, and solid-state drives, and may be used as an overflow data storage device, and is configured to store programs when these programs are selectively executed, and store instructions and data that are read during program execution. The memory 460 may be volatile and/or non-volatile, and may be a read-only memory (ROM), a random access memory (RAM), a ternary content-addressable memory (TCAM), and/or a static random access memory (SRAM).

Figure 6:
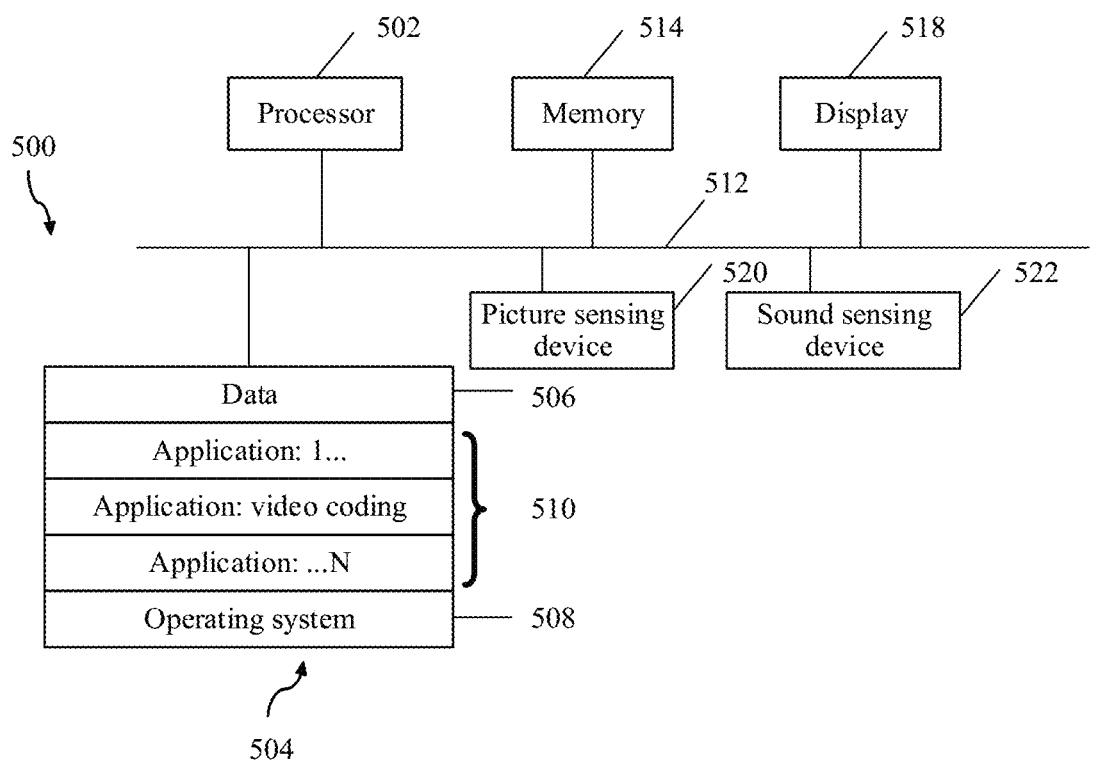
FIG. 6 is a block diagram illustrating an example of another encoding apparatus or another decoding apparatus.

FIG. 6 is a simplified block diagram of an apparatus 500 that can be used as any one or two of the source device 12 and the destination device 14 in FIG. 1 according to an example embodiment. The apparatus 500 may implement the technologies in this application. The apparatus 500 that is configured to implement chroma block prediction may use a form of a computing system including a plurality of computing devices, or may use a form of a single computing device such as a mobile phone, a tablet computer, a laptop computer, a notebook computer, or a desktop computer.

A processor 502 in the apparatus 500 may be a central processing unit. Alternatively, the processor 502 may be any other type of existing or future device or devices that can control or process information. As shown in FIG. 6, although the disclosed implementations may be practiced by using a single processor such as the processor 502, advantages in speed and efficiency may be achieved by using more than one processor.

In an implementation, a memory 504 in the apparatus 500 may be a read-only memory device or a random access memory device. Any other proper type of storage device may be used as the memory 504. The memory 504 may include code and data 506 that is accessed by the processor 502 by using a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video encoding application for performing the method described in this specification. The apparatus 500 may further include an additional memory in a form of a secondary memory 514. The secondary memory 514 may be, for example, a memory card used together with a mobile computing device. Because a video communication session may contain a large amount of information, the information may be completely or partially stored in the secondary memory 514 and loaded into the memory 504 for processing as required.

The apparatus 500 may further include one or more output devices, for example, a display 518. In an example, the display 518 may be a touch-sensitive display that combines a display with a touch-sensitive element that can be operated to sense a touch input. The display 518 may be coupled to the processor 502 by using the bus 512. In addition to the display 518, another output device that allows a user to program the apparatus 500 or use the apparatus 500 in another manner may be further provided, or another output device may be provided as an alternative to the display 518. When the output device is a display or includes a display, the display may be implemented differently, for example, by using a liquid crystal display, a cathode-ray tube (CRT) display, a plasma display, or a light emitting diode (LED) display such as an organic LED (OLED) display.

The apparatus 500 may further include a picture sensing device 520, or may be connected to the picture sensing device 520. The picture sensing device 520 is, for example, a camera or any other existing or future picture sensing device 520 that can sense a picture. The picture is, for example, a picture of a user who runs the apparatus 500. The picture sensing device 520 may be placed directly facing the user who runs the apparatus 500. In an example, a location and an optical axis of the picture sensing device 520 may be configured, so that a field of view of the picture sensing device 520 includes a region adjacent to the display 518, and the display 518 can be seen from the region.

The apparatus 500 may further include a sound sensing device 522, or may be connected to the sound sensing device 522. The sound sensing device 522 is, for example, a microphone or any other existing or future sound sensing device that can sense a sound near the apparatus 500. The sound sensing device 522 may be placed directly facing the user who runs the apparatus 500, and may be configured to receive a sound such as a voice or another sound that is made by the user when the user runs the apparatus 500.

Although the processor 502 and the memory 504 of the apparatus 500 are integrated into one unit as illustrated in FIG. 6, other configurations can be used. The running of the processor 502 may be distributed in a plurality of machines that may be directly coupled (each machine has one or more processors), or may be distributed in a local region or in another network. The memory 504 may be distributed in a plurality of machines such as a network-based memory and a memory in a plurality of machines that run the apparatus 500. Although a single bus is drawn herein, there may be a plurality of buses 512 of the apparatus 500. Further, the secondary memory 514 may be directly coupled to the other components of the apparatus 500 or may be accessed through a network, and may include a single integrated unit such as a memory card, or a plurality of units such as a plurality of memory cards. Therefore, the apparatus 500 may be implemented in a plurality of configurations.

Figure 7:
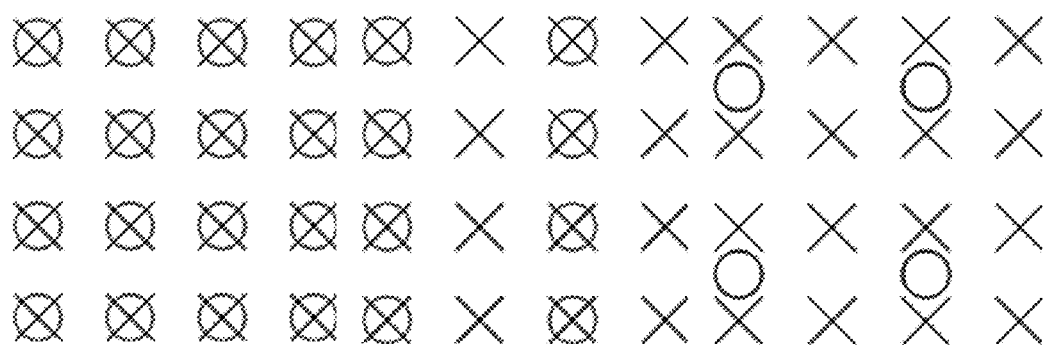
FIG. 7 shows an example of a sampling grid in a YUV format.

As described above in this application, in addition to a luma (Y) component, a color video further includes a chroma component (U, V). Therefore, in addition to the luma component, the chroma component also needs to be encoded. According to different methods for sampling a luma component and a chroma component in a color video, YUV4:4:4, YUV4:2:2, and YUV4:2:0 generally exist. As shown in FIG. 7, a cross represents a luma component sample, and a circle represents a chroma component sample.

4:4:4 format: A chroma component is not downsampled.

4:2:2 format: For a chroma component relative to a luma component, 2:1 horizontal downsampling is performed, and no vertical downsampling is performed. For every two U samples or V samples, each row includes four Y samples.

4:2:0 format: For a chroma component relative to a luma component, 2:1 horizontal downsampling is performed, and 2:1 vertical downsampling is performed.

YUV4:2:0 is the most common format. When a video picture is in a YUV4:2:0 sampling format, if a luma component of a picture block is a 2M×2N picture block, a chroma component of the picture block is an M×N picture block. Therefore, the chroma component of the picture block is also referred to as a chroma block or a chroma component block in this application. This application is described by using YUV4:2:0 as an example, but is also applicable to another method for sampling a luma component and a chroma component.

In this application, a sample in a chroma picture is briefly referred to as a chroma sample or a chroma point, and a sample in a luma picture is briefly referred to as a luma sample or a luma point.

Similar to a luma component, in chroma intra prediction, a boundary sample of a neighboring reconstructed block around a current chroma block is also used as a reference sample of the current block, and the reference sample is mapped to a sample in the current chroma block according to a specific prediction mode, to serve as a predictor of the sample in the current chroma block. A difference lies in that, because texture of the chroma component is usually relatively simple, a quantity of intra prediction modes for the chroma component is usually less than a quantity of intra prediction modes for the luma component.

A cross-component prediction mode is also referred to as a cross-component intra prediction mode or a CCLM prediction mode. The CCLM prediction mode may also be briefly referred to as a linear model mode. An LM mode (referred to as a linear model or a linear mode) is a chroma intra prediction method in which a texture correlation between luminance and chrominance is used. In the LM, a predictor of a current chroma block is derived by using a reconstructed luma component according to a linear model, and may be represented by using the following formula:

$$\text{pred}_C(i,j) = \alpha \text{rec}'_L(i,j) + \beta \quad (1)$$

Herein, $\alpha$ and $\beta$ are linear model coefficients, where $\alpha$ is a scaling coefficient, and $\beta$ is an offset factor, $\text{pred}_C(i,j)$ is a predictor of a chroma sample at a location (i, j), and $\text{rec}'_L(i,j)$ is a luma reconstructed sample value at the location (i, j) after a luma reconstructed block corresponding to the current chroma block (briefly referred to as a corresponding luma block below) is downsampled to a chroma component resolution. For a video in a YUV4:2:0 format, a resolution of a luma component is four times a resolution of a chroma component (a width and a height of the luma component each are twice those of the chroma component). To obtain a luma block with a same resolution as a chroma block, the luma component needs to be downsampled to a chroma resolution according to a downsampling method the same as that for the chroma component.

Figure 8:
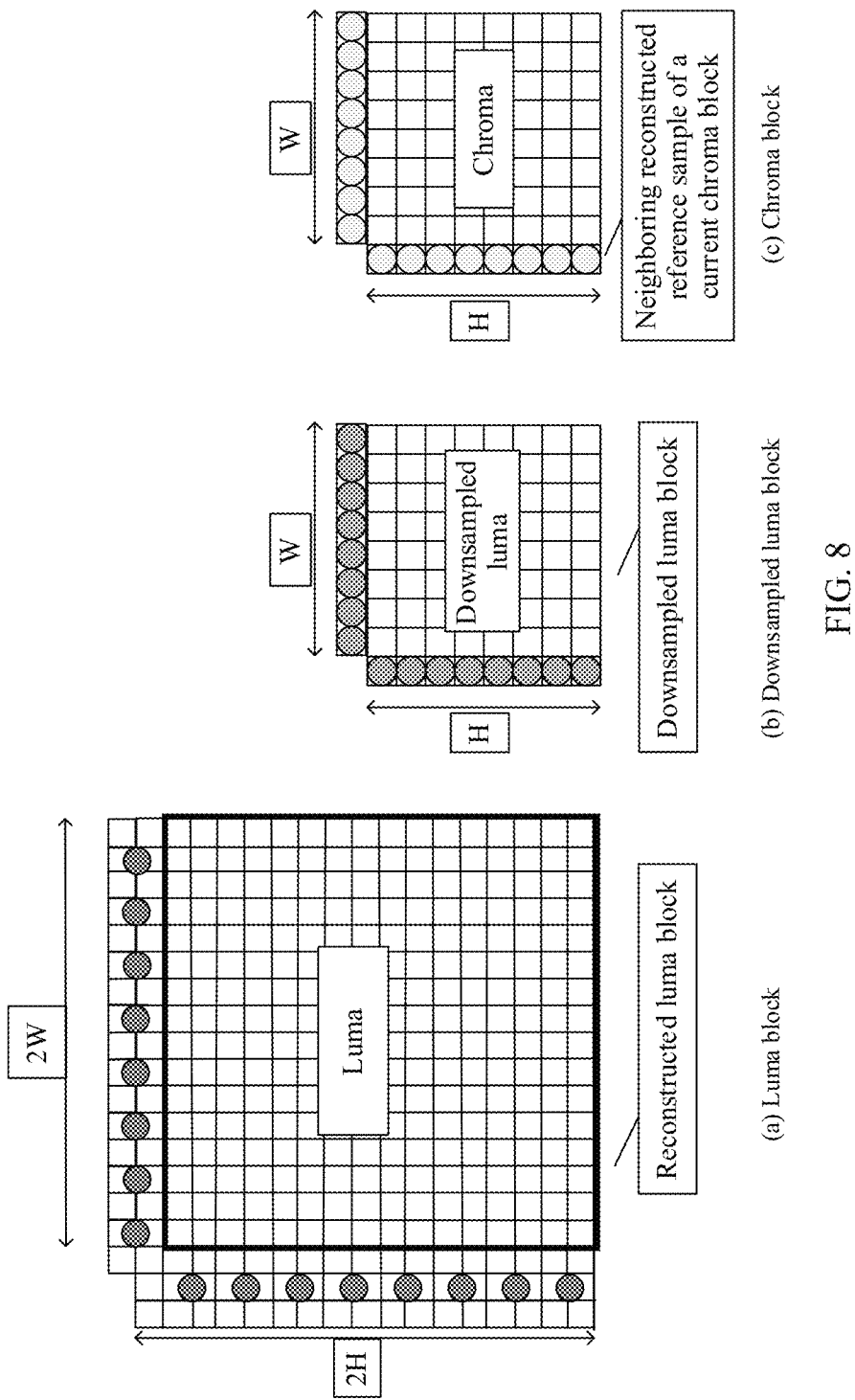
FIG. 8 shows an embodiment of a cross-component prediction mode.

The linear model coefficients $\alpha$ and $\beta$ do not need to be encoded for transmission, but are derived by using edge samples of a neighboring reconstructed block of the current chroma block and luma samples corresponding to the edge samples. FIG. 8 shows an embodiment of a cross-component prediction mode. In FIG. 8, recL is a reconstructed luma block (a current chroma block corresponds to a reconstructed block of a luma block and neighboring reference samples), recL' is a downsampled luma block, and recC' is neighboring reconstructed reference samples of the current chroma block. A size of the current chroma block is W×H, and by using top neighboring reconstructed samples and left neighboring reconstructed samples of the current chroma block as reference samples, a size of the corresponding luma block is 2W×2H. The luma block and the reference samples of the luma block are downsampled to a chroma resolution, to obtain a sample block shown in FIG. 8(b). Neighboring reference samples in FIG. 8(b) and FIG. 8(c) have a one-to-one correspondence.

For ease of description, in this application, a top neighboring sample and a left neighboring sample that are used to calculate a linear model coefficient are referred to as neighboring samples, a sample on the top is a top neighboring sample, and a sample on the left is a left neighboring sample. Samples neighboring to a chroma block are referred to as neighboring samples (which include a top neighboring sample and a left neighboring sample), and samples neighboring to a luma block are referred to as neighboring samples (which include a top neighboring sample and a left neighboring sample). Chroma samples are in a one-to-one correspondence with luma samples, and values of samples form a value pair.

Figure 9:
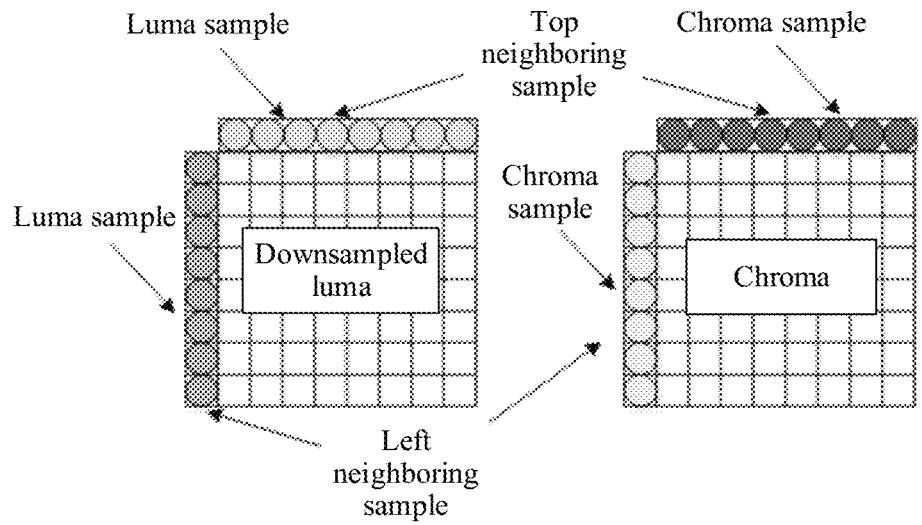
FIG. 9 is a schematic diagram of neighboring samples.
Figure 10:
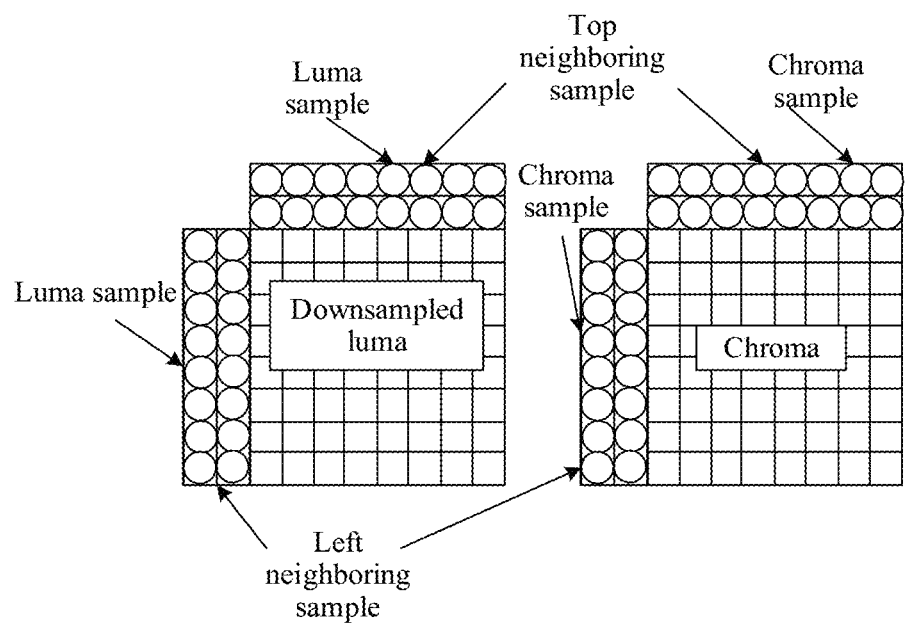
FIG. 10 is another schematic diagram of neighboring samples.

In the embodiments of this application, luma samples usually need to be obtained through downsampling (because a resolution of a chroma component is different from that of a luma component), and are denoted as Luma' samples. Chroma samples are usually one row or two rows of top neighboring samples of a current chroma block and one column or two columns of left neighboring samples of the current chroma block. FIG. 9 is a schematic diagram of using one row and one column, and FIG. 10 is a schematic diagram of using two rows and two columns.

In the LM mode, a correlation between a luma component and a chroma component can be effectively used. Compared with a directional prediction mode, the LM mode is more flexible, and therefore provides a more accurate prediction signal for a chroma component.

In addition, there is also a multi-model linear model (MMLM) mode, and there are a plurality of pieces of α and β. In an example of two linear models, there are two groups of linear model coefficients: $\alpha_1$ and $B_1$, and $\alpha_2$ and $B_2$.

This application provides a chroma block prediction method. The following describes in detail a processing procedure shown in FIG. 11 according to an embodiment. This process exists in both an encoding process and a decoding process. In this embodiment of this application, a decoder side is used as an example for solution description, and content may be as follows:

Operation 1101: Obtain chroma values of chroma samples at preset locations from neighboring samples of a chroma block.

The chroma block is a chroma block on which intra prediction is currently to be performed. A quantity of chroma samples at the preset locations (which may be briefly referred to as a preset quantity) may be preset. For example, the preset quantity is 2, 4, 6, or 8. The neighboring samples of the chroma block are reconstructed samples neighboring to the chroma block, referring to FIG. 9 and FIG. 10.

In an embodiment, when intra prediction needs to be performed on a current chroma block (which may be briefly referred to as the chroma block subsequently), the chroma values of the chroma samples at the preset locations may be obtained from the neighboring samples of the chroma block, and may be represented as a set ϕ, where ϕ={$C_0$, $C_1$, ..., $C_{M-1}$}, and M represents a preset quantity, that is, a quantity of obtained chroma values.

Figure 12:
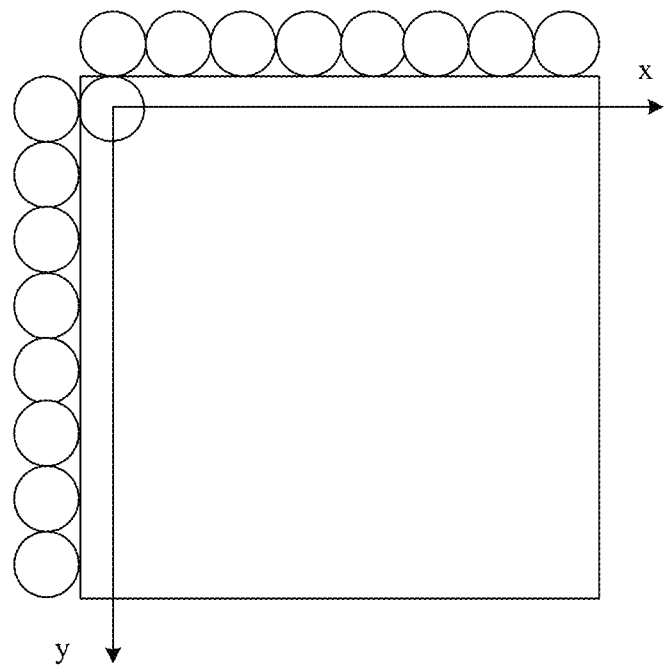
FIG. 12 is a schematic diagram of an established rectangular coordinate system.

In an embodiment, when there is only one linear mode (which may also be referred to as an intra linear prediction mode), in a coordinate system shown in FIG. 12, the preset locations are usually (0, −1) (X−1, −1), (−1, 0), and (−1, Y−1), and the chroma values of the chroma samples at the preset locations may be obtained from the neighboring samples of the chroma block.

In an embodiment, the decoder side may determine, based on indication information in a bitstream, an intra prediction mode corresponding to the chroma block, and determine the preset locations based on the intra prediction mode. Corresponding processing may include:

obtaining indication information, determining, based on the indication information, an intra prediction mode corresponding to the chroma block, and determining the preset locations based on the intra prediction mode corresponding to the chroma block.

The intra prediction mode corresponding to the chroma block may include at least one of an LM, an LMA, and an LML. The indication information is used to indicate the intra prediction mode corresponding to the chroma block.

In an embodiment, when performing encoding, an encoder side encodes the intra prediction mode corresponding to the chroma block, and then sends the intra prediction mode to the decoder side (this process is described below).

The decoder side may obtain the indication information from the received bitstream, and determine, based on the indication information, the intra prediction mode corresponding to the chroma block. Then, the decoder side determines the preset locations based on the intra prediction mode corresponding to the chroma block.

In an embodiment, the indication information may be set in a syntax table, as shown in Table 1.

TABLE 1

| coding_unit(x0,y0,cbWidth,cbHeight,treeType) { | Descriptor |
|---|---|
| ... | |
| if( CuPredMode[x0][y0] ==MODE_INTRA ) | |
| { /* MODE_INTRA */ | |
| ... | |
| intra_chroma_pred_mode[x0][y0] | |
| ... | |
| } else { /* MODE_INTER */ | |
| ... | |
| coding_unit(x0,y0,cbWidth,cbHeight,treeType) { | |
| } | |
| ... | |
| } | |

In Table 1, the syntax element CuPredMode[x0][y0] in the syntax table is used to indicate whether a prediction mode for the current chroma block is an intra prediction mode or an inter prediction mode. For example, when CuPredMode[x0][y0] is MODE_INTRA, it indicates that an intra prediction mode is used for the current chroma block, and when CuPredMode[x0][y0] is MODE_INTER, it indicates that an inter prediction mode is used for the current chroma block. Herein, x0 and y0 represent coordinates of the current chroma block in a video picture.

The syntax element intra_chroma_pred_mode[x0][y0] is used to indicate intra prediction mode information (that is, the foregoing indication information) of the current chroma block. For example, when intra_chroma_pred_mode[x0][y0]=0, it indicates that an LM0 mode is used for the current chroma block, when intra_chroma_pred_mode[x0][y0]=1, it indicates that an LM1 mode is used for the current chroma block, when intra_chroma_pred_mode[x0][y0]=2, it indicates that an LM2 mode is used for the current chroma block, and when intra_chroma_pred_mode[x0][y0]=N−1, it indicates that an LM(N−1) mode is used for the current chroma block. Herein, N represents N different LMs that may be selected by the encoder side for the current chroma block, and LM0, LM1, . . . , and LM(N−1) represent different intra prediction modes.

In an embodiment, when there are a plurality of linear modes, there are different preset locations for for different linear modes, and corresponding processing in operation 1101 may include:

obtaining the chroma values of the chroma samples at the preset locations from the neighboring samples of the chroma block based on a preset correspondence between an intra prediction mode and a preset location and the intra prediction mode corresponding to the chroma block.

In an embodiment, when performing decoding, the decoder side may determine the intra prediction mode corresponding to the chroma block, then obtain the preset correspondence between an intra prediction mode and a preset location, and determine, from the correspondence, the preset locations corresponding to the intra prediction mode for the chroma block. Then, the decoder side obtains the chroma values of the chroma samples at the preset locations from the neighboring samples of the chroma block.

It should be noted that, in the foregoing correspondence, the recorded preset locations may be location coordinates of the preset locations.

In an embodiment, to better describe the preset locations, as shown in FIG. 12, a rectangular plane coordinate system is correspondingly established for the chroma block in this embodiment of this application. The first chroma sample in a top-left corner of the chroma block is used as a coordinate origin, a horizontal direction to the right is a positive direction of an x axis, and a vertical direction to the bottom is a positive direction of a y axis. In this way, location coordinates of top neighboring samples of the chroma block are (0, −1), (1, −1), . . . , and (X−1, −1), and location coordinates of left neighboring samples of the chroma block are (−1, 0), (−1, 1), . . . , and (−1, Y−1), where X represents a width of the chroma block (that is, a quantity of samples in a width direction of the chroma block), and Y represents a height of the chroma block (that is, a quantity of samples in a height direction of the chroma block).

If the intra prediction mode is LM0, in the correspondence, the location coordinates of the preset locations may be (0, −1), (X−1, −1), (−1, 0), and (−1, Y−1).

If the intra prediction mode is LM1, in the correspondence, the location coordinates of the preset locations may be (0, −1), (X/4, −1), (X−1-X/4, −1), and (X−1, −1).

If the intra prediction mode is LM2, in the correspondence, the location coordinates of the preset locations may be (−1, 0), (−1, Y/4), (−1, Y−1-Y/4), and (−1, Y−1).

If the intra prediction mode is LM3, in the correspondence, the location coordinates of the preset locations may be (X−2, −1), (X−1, −1), (−1, Y−2), and (−1, Y−1).

If the intra prediction mode is LM(N−1), in the correspondence, the location coordinates of the preset locations may be (0, −1), (1, −1), (X−2, −1), and (X−1, −1).

It can be learned that, when there are a plurality of linear modes, different linear modes may correspond to different preset locations.

Figure 13:
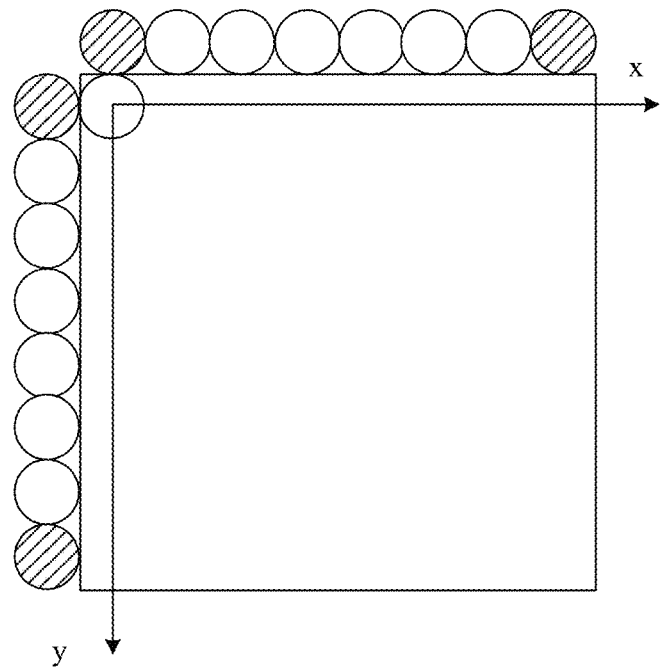
FIG. 13 is a schematic diagram of chroma samples at preset locations.

In addition, when the linear mode is an LM, an LMA, and an LML, the location coordinates of the preset locations are further separately listed, which may be as follows:

If the intra prediction mode is an LM, in the correspondence, the location coordinates of the preset locations may be (0, −1), (X−1, −1), (−1, 0), and (−1, Y−1), as shown by a circle with a shadow oblique line in FIG. 13.

Figure 14A:
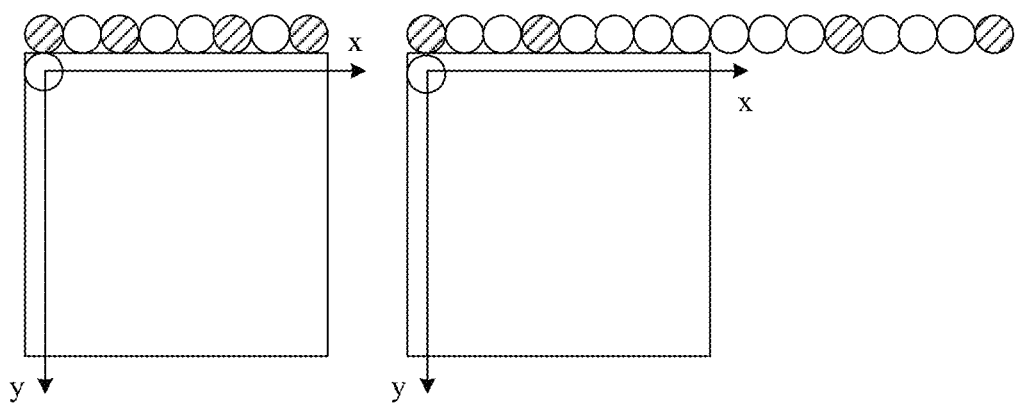
FIG. 14(a) and FIG. 14(b) are schematic diagrams of chroma samples at preset locations.
Figure 14B:
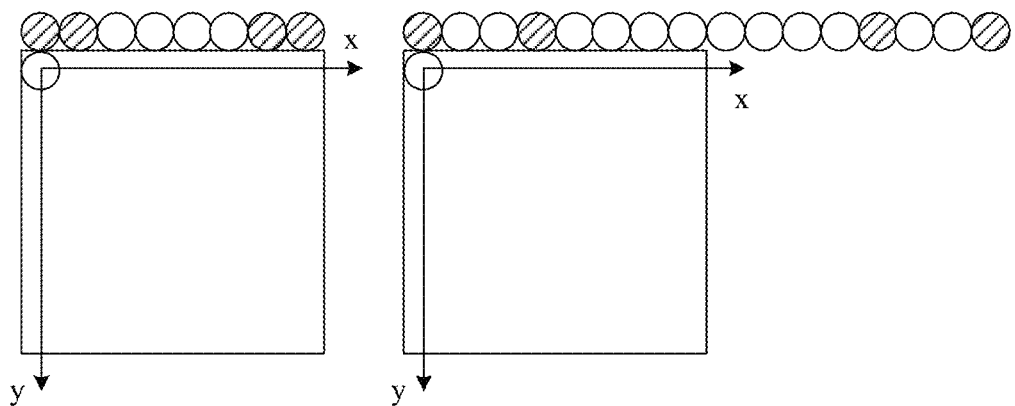

If the intra prediction mode is an LMA, in the correspondence, the location coordinates of the preset locations may be (0, −1), (X/4, −1), (X−1-X/4, −1), and (X−1, −1), as shown by circles filled with slashes in FIG. 14(*a*), or (0, −1), (X/4, −1), (3*X/4, −1), and (X−1, −1), as shown by circles filled with slashes in FIG. 14(*b*).

Figure 15A:
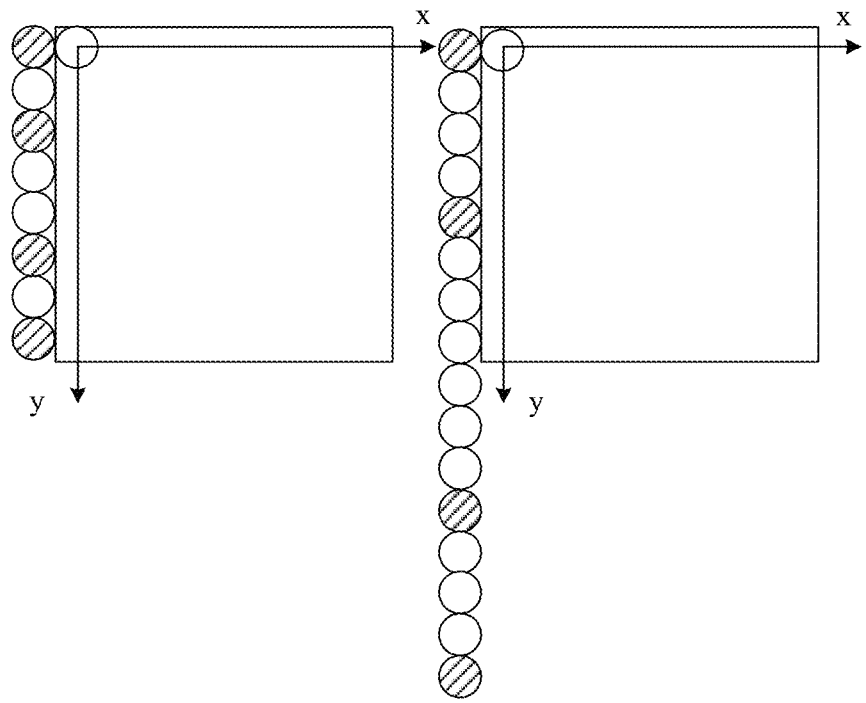
FIG. 15(a) and FIG. 15(b) are schematic diagrams of chroma samples at preset locations.
Figure 15B:
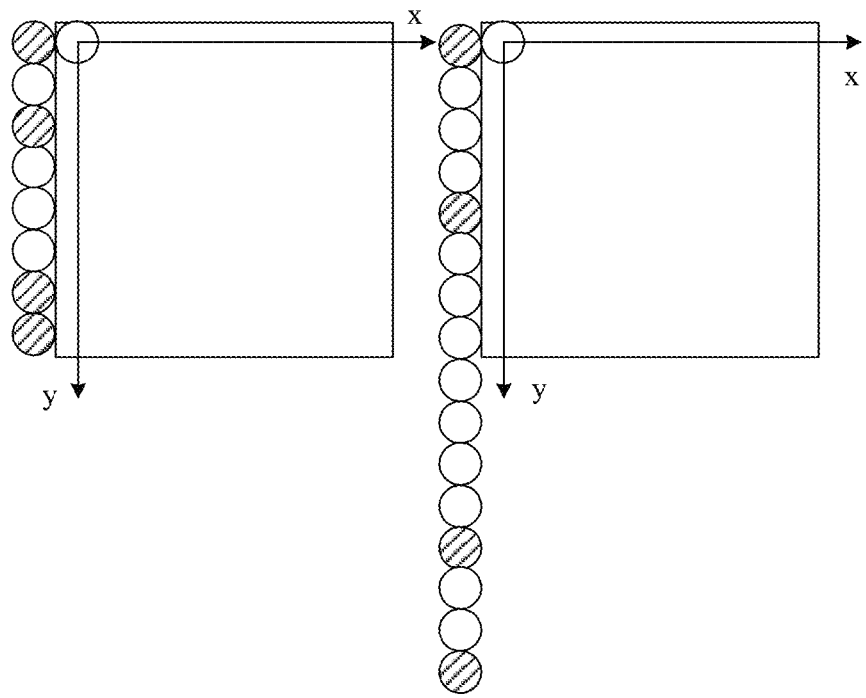

If the intra prediction mode is an LML, in the correspondence, the location coordinates of the preset locations may be (−1, 0), (−1, Y/4), (−1, Y−1-Y/4), and (−1, Y−1), as shown by circles filled with slashes in FIG. 15(*a*), or (−1, 0), (−1, Y/4), (−1, 3*Y/4), and (−1, Y−1), as shown by circles filled with slashes in FIG. 15(*b*).

It should be noted that the location coordinates of the preset locations are merely an example. This is not limited in this embodiment of this application.

In addition, when the intra prediction mode is an LM, the preset quantity may alternatively be 2, and the location coordinates of the preset locations may be (X−1, −1) and (−1, Y−1), as shown by circles filled with slashes in FIG. 16(*a*), or may be (X/2, −1) and (−1, Y/2), as shown by circles filled with slashes in FIG. 16(*b*), or may be (X/2, −1) and (−1, Y−1), as shown by circles filled with slashes in FIG. 16(*c*), or may be (X−1, −1) and (−1, Y/2), as shown by circles filled with slashes in FIG. 16(*d*). This is merely an example, and is not limited in this embodiment of this application.

It should be noted that X and Y are usually greater than or equal to 4. X and Y in FIG. 13 and FIG. 16(*a*) to FIG. 16(*d*) are 8 and 8 respectively, X in FIG. 14(*a*) is 8, X in FIG. 14(*b*) is 16, Y in FIG. 15(*a*) is 8, and Y in FIG. 15(*b*) is 16. The foregoing values are merely an embodiment. This is not limited in this embodiment of this application. In addition, in FIG. 12 to FIG. 16(*d*), a box represents the chroma block.

Operation 1102: Obtain, based on neighboring samples of a luma block corresponding to the chroma block, luma values of luma samples corresponding to the chroma samples at the preset locations.

In an embodiment, after the chroma values are obtained, the luma block corresponding to the chroma block may be determined, and then the luma values of the luma samples corresponding to the chroma samples at the preset locations may be obtained from the neighboring samples of the luma block, and may be represented as a set $\psi$, where $\psi=\{L_0, L_1, \ldots, L_{M-1}\}$, and M represents a preset quantity, that is, a quantity of obtained luma values.

In an embodiment, for operation 1102, the luma values may be selected in a plurality of manners. The following provides two feasible processing manners:

Manner 1: Determine, from the neighboring samples of the luma block, that location coordinates of a luma sample corresponding to a chroma sample at an $i^{th}$ preset location in the preset locations are $(2*X_i, 2*Y_i)$, where location coordinates of the chroma sample at the $i^{th}$ preset location are $(X_i, Y_i)$; and obtain, from the neighboring samples of the luma block corresponding to the chroma block based on location coordinates of the luma samples corresponding to the chroma samples at the preset locations, the luma values of the luma samples corresponding to the chroma samples at the preset locations.

The $i^{th}$ preset location is any one of the preset locations.

In an embodiment, when the chroma block is decoded, the location coordinates of the chroma sample at the $i^{th}$ preset location in the preset locations are $(X_i, Y_i)$ ($X_i$ is a horizontal coordinate at the $i^{th}$ preset location in the coordinate system shown in FIG. 12, and $Y_i$ is a vertical coordinate at the $i^{th}$ preset location in the coordinate system shown in FIG. 12), and it may be determined, from the neighboring samples of the luma block, that the location coordinates of the luma sample corresponding to the chroma sample at the $i^{th}$ preset location are $(2*X_i, 2*Y_i)$. In this way, the location coordinates of the luma samples corresponding to the chroma samples at the preset locations may be obtained. Then, the luma values may be obtained from the corresponding luma samples based on the location coordinates of the luma samples corresponding to the chroma samples at the preset locations.

Manner 2: Determine, from the neighboring samples of the luma block based on location coordinates of a chroma sample at a $j^{th}$ preset location in the preset locations, location coordinates of a plurality of samples corresponding to the $j^{th}$ preset location; determine, based on the location coordinates of the plurality of samples, location coordinates of a luma sample corresponding to the chroma sample at the $j^{th}$ preset location; and obtain, from the neighboring samples of the luma block corresponding to the chroma block based on location coordinates of the luma samples corresponding to the chroma samples at the preset locations, the luma values of the luma samples corresponding to the chroma samples at the preset locations.

The $j^{th}$ preset location is any one of the preset locations.

In an embodiment, when the chroma block is decoded, the location coordinates of the chroma sample at the $j^{th}$ preset location in the preset locations are $(X_j, Y_j)$ ($X_j$ is a horizontal coordinate at the $j^{th}$ preset location in the coordinate system shown in FIG. 12, and $Y_j$ is a vertical coordinate at the $j^{th}$ preset location in the coordinate system shown in FIG. 12). For the chroma sample at the $j^{th}$ preset location, the plurality of sample locations of the neighboring samples of the luma block corresponding to $(X_j, Y_j)$ may be determined based on the location coordinates of the chroma sample at the $j^{th}$ preset location, and then the location coordinates of the luma sample corresponding to the chroma sample at the $j^{th}$ preset location may be obtained based on the location coordinates of the plurality of sample locations.

For example, a weighting method may be used. The location coordinates of the plurality of sample locations may be $(2*Xj, 2*Yj)$, $(2*Xj, 2*Yj+1)$, $(2*Xj+1, 2*Yj)$, $(2*Xj+1, 2*Yj+1)$, $(2*Xj+2, 2*Yj)$, and $(2*Xj+2, 2*Yj+1)$, and all the sample locations correspond to weighted values, which are $2/8$, $1/8$, $1/8$, $2/8$, $1/8$, and $1/8$ respectively. After weighting is performed, the location coordinates $(2*Xj, 2*Yj+0.5)$ of the luma sample corresponding to the chroma sample at the $j^{th}$ preset location may be obtained. In addition, a weighting method may not be used. This is not limited in this embodiment of this application. In this way, the location coordinates of the luma samples corresponding to the chroma samples at the preset locations may be obtained. Then, the luma values may be obtained from the corresponding luma samples based on the location coordinates of the luma samples corresponding to the chroma samples at the preset locations.

Operation 1103: Classify the obtained luma values into a first luma set and a second luma set.

In an embodiment, after the luma values are obtained, the obtained luma values may be classified into the first luma set and the second luma set.

In an embodiment, the luma sets may be obtained in a plurality of manners. This embodiment of this application provides three feasible manners:

Manner 1: Determine an average value of the luma values of the luma samples corresponding to the chroma samples at the preset locations; and group luma values that are in the luma values of the luma samples corresponding to the chroma samples at the preset locations and that are less than or equal to the average value of the luma values into the first luma set, and group luma values that are in the luma values of the luma samples corresponding to the chroma samples at the preset locations and that are greater than the average value of the luma values into the second luma set.

In an embodiment, the average value of the luma values obtained in operation 1102 may be determined. Then, the luma values that are in the luma values obtained in operation 1102 and that are less than or equal to the average value of the luma values are determined and grouped into the first luma set. In addition, the luma values that are in the luma values obtained in operation 1102 and that are greater than the average value of the luma values may be determined and grouped into the second luma set. In this way, the luma values in the first luma set are less than the luma values in the second luma set.

The following formulas are used for representation:
the average value of the luma values is $$L_{mean} = \frac{L_0 + L_1 + \ldots + L_{M-1}}{M};$$

the obtained first luma set is $\psi = \{L_{i0}, L_{i1}, \ldots, L_{ij}, \ldots, L_{iS}\}$, where $L_{ij} \leq L_{mean}$; and
the obtained second luma set is $\psi_R = \{L_{j0}, L_{j1}, \ldots L_{ji}, \ldots, L_{jT}\}$, where $L_{ji} > L_{mean}$.

Manner 2: Sort the luma values of the luma samples corresponding to the chroma samples at the preset locations in ascending order, to obtain a first luma value queue; and if a quantity of luma samples in the first luma value set is an even number, group luma values of the first half part in the first luma value queue into the first luma set, and group luma values of the second half part in the luma value queue into the second luma set.

In an embodiment, the luma values obtained in operation 1102 may be sorted in ascending order, to obtain the first luma value queue. If the quantity of luma samples in the first luma value queue is an even number, the luma values of the first half part in the first luma value queue may be determined and grouped into the first luma set; in addition, the luma values of the second half part in the first luma value queue may be determined and grouped into the second luma set.

For example, if four luma values are obtained in operation 1102, which are L1, L2, L3, and L4 in sequence, and L4<L2<L1<L3, the first luma value queue is L4, L2, L1, and L3. In this case, the first luma set is {L4, L2}, and the second luma set is {L1, L3}.

Manner 3: Sort the luma values of the luma samples corresponding to the chroma samples at the preset locations in descending order, to obtain a second luma value queue; and if a quantity of luma samples in the second luma value set is an even number, classify luma values of the second half part in the second luma value queue into the first luma set, and classify luma values of the first half part in the luma value queue into the second luma set.

In an embodiment, the luma values obtained in operation 1102 may be sorted in descending order, to obtain the second luma value queue. If the quantity of luma samples in the second luma value queue is an even number, the luma values of the second half part in the second luma value queue may be determined and grouped into the first luma set; in addition, the luma values of the first half part in the second luma value queue may be determined and grouped into the second luma set.

For example, if four luma values are obtained in operation 1102, which are L1, L2, L3, and L4 in sequence, and L3>L1>L2>L4, the second luma value queue is L3, L1, L2, and L4. In this case, the first luma set is {L4, L2}, and the second luma set is {L1, L3}.

In addition, when the quantity of luma samples in the first luma value queue in Manner 2 is an odd number, if the first luma value queue includes N luma values, the first (N−1)/2 luma values may be grouped into the first luma set, and the last (N+1)/2 luma values may be grouped into the second luma set, or the first (N+1)/2 luma values may be grouped into the first luma set, and the last (N−1)/2 luma values may be grouped into the second luma set. Similarly, when the quantity of luma samples in the second luma value queue in Manner 3 is an odd number, if the second luma value queue includes N luma values, the first (N−1)/2 luma values may be grouped into the second luma set, and the last (N+1)/2 luma values may be grouped into the first luma set, or the first (N+1)/2 luma values may be grouped into the second luma set, and the last (N−1)/2 luma values may be grouped into the first luma set.

Operation 1104: Group chroma values of chroma samples corresponding to luma samples associated with luma values in the first luma set into a first chroma set, and group chroma values of chroma samples corresponding to luma samples associated with luma values in the second luma set into a second chroma set.

In an embodiment, after the first luma set and the second luma set are obtained, the chroma values corresponding to all the luma values in the first luma set may be classified into the first chroma set, and the chroma values corresponding to all the luma values in the second luma set may be classified into the second chroma set. The following formulas may be used for representation:

the first chroma set is $\phi = \{C_{i0}, C_{i1}, \ldots, C_{ij}, \ldots, C_{iS}\}$; and the obtained second chroma set is $\phi_R = \{C_{j0}, C_{j1}, \ldots, C_{ji}, \ldots, C_{jT}\}$.

It should be noted that, in operation 1101, the luma samples corresponding to the chroma samples are used to determine the luma values. The chroma values corresponding to the luma values herein are the chroma values of the chroma samples corresponding to the luma samples associated with the luma values.

Operation 1105: Determine, based on an average value of the luma values in the first luma set, an average value of the luma values in the second luma set, an average value of the chroma values in the first chroma set, and an average value of the chroma values in the second chroma set, a scaling coefficient in a linear model corresponding to the chroma block.

In an embodiment, after the first luma set, the second luma set, the first chroma set, and the second chroma set are determined, the average value of the luma values in the first luma set and the average value of the luma values in the second luma set may be determined, and the average value of the chroma values in the first chroma set and the average value of the chroma values in the second chroma set may be determined. Corresponding to Manner 1, the following formulas are used for representation:

the average value of the luma values in the first luma set is $$L_{Lmean} = \frac{\left(\sum_{ij=0}^{S-1} L_{ij}\right)}{S};$$

the average value of the luma values in the second luma set is $$L_{Rmean} = \frac{\left(\sum_{ji=0}^{T-1} L_{ji}\right)}{T};$$

the average value of the chroma values in the first chroma set is $$C_{Lmean} = \frac{\left(\sum_{ij=0}^{S-1} C_{ij}\right)}{S};$$

and
the average value of the chroma values in the second chroma set is $$C_{Rmean} = \frac{\left(\sum_{ji=0}^{T-1} C_{ji}\right)}{T}.$$

Then, the scaling coefficient in the linear model corresponding to the chroma block is determined based on the average value of the luma values in the first luma set, the average value of the luma values in the second luma set, the average value of the chroma values in the first chroma set, and the average value of the chroma values in the second chroma set.

In an embodiment, the scaling coefficient may be determined by using a formula, and corresponding processing may be as follows:

$$\alpha = \frac{C_{Lmean} - C_{Rmean}}{L_{Lmean} - L_{Rmean}},$$

where $\alpha$ is the scaling coefficient in the linear model corresponding to the chroma block, $C_{Lmean}$ is the average value of the chroma values in the first chroma set, $C_{Rmean}$ is the average value of the chroma values in the second chroma set, $L_{Lmean}$ is the average value of the luma values in the first luma set, and $L_{Rmean}$ is the average value of the luma values in the second luma set.

In an embodiment, a preset calculation formula for the scaling coefficient may be obtained, and then $C_{Lmean}$, $C_{Rmean}$, $L_{Lmean}$, and $L_{Rmean}$ are substituted into the calculation formula for the scaling coefficient $$\alpha = \frac{C_{Lmean} - C_{Rmean}}{L_{Lmean} - L_{Rmean}},$$

to obtain the scaling coefficient in the linear model corresponding to the chroma block.

Operation 1106: Determine, based on the scaling coefficient, an offset factor in the linear model corresponding to the chroma block.

In an embodiment, after the scaling coefficient is determined, the offset factor in the linear model corresponding to the chroma block may be determined based on the scaling coefficient. The offset factor may be determined in a plurality of manners. This embodiment of this application provides two feasible manners:

Manner 1: Determine, based on the scaling coefficient, the average value of the chroma values in the first chroma set, and the average value of the luma values in the first luma set, the offset factor in a linear model corresponding to the chroma block.

In an embodiment, the average value of the chroma values in the first chroma set may be determined:

$$C_{Lmean} = \frac{\left(\sum_{ij=0}^{S-1} C_{ij}\right)}{S},$$

and the average value of the luma values in the first luma set may be determined:

$$L_{Lmean} = \frac{\left(\sum_{ij=0}^{S-1} L_{ij}\right)}{S}.$$

Then, the offset factor in a linear model corresponding to the chroma block is determined based on the scaling coefficient, the average value of the chroma values in the first chroma set, and the average value of the luma values in the first luma set.

In an embodiment, the offset factor may be determined by using the following formula, and corresponding processing may be as follows:

$\beta = C_{Lmean} - \alpha * L_{Lmean}$, where $\alpha$ is the scaling coefficient, $\beta$ is the offset factor in the linear model corresponding to the chroma block, $C_{Lmean}$ is the average value of the chroma values in the first chroma set, and $L_{Lmean}$ is the average value of the luma values in the first luma set.

In an embodiment, a preset calculation formula for the offset factor may be obtained, and then the scaling coefficient obtained in operation 1105, $C_{Lmean}$, and $L_{Lmean}$ are substituted into the calculation formula for the offset factor $\beta = C_{Lmean} - \alpha * L_{Lmean}$, to obtain the offset factor in the linear model corresponding to the chroma block.

Manner 2: Determine, based on the scaling coefficient, an average value of the chroma values of the chroma samples at the preset locations, and the average value of the luma values of the luma samples corresponding to the chroma samples, the offset factor in the linear model corresponding to the chroma block.

In an embodiment, the average value of the chroma values of the chroma samples at the preset locations may be determined:

$$C_{mean} = \frac{\left(\sum_{m=0}^{M-1} C_m\right)}{M},$$

and the average value of the luma values of the luma samples corresponding to the chroma samples may be determined:

$$L_{mean} = \frac{\left(\sum_{m=0}^{M-1} L_m\right)}{M}.$$

Then, the offset factor corresponding to the chroma block is determined by using the scaling coefficient, $C_{mean}$, and $L_{mean}$.

In an embodiment, the offset factor may be determined by using the following formula, and corresponding processing may be as follows:

$\beta = C_{mean} - \alpha * L_{mean}$, where $\alpha$ is the scaling coefficient, $\beta$ is the offset factor in the linear model corresponding to the chroma block, $C_{mean}$ is the average value of the chroma values of the chroma samples at the preset locations, and $L_{mean}$ is the average value of the luma values of the luma samples corresponding to the chroma samples at the preset locations.

In an embodiment, a preset calculation formula for the offset factor may be obtained, and then the scaling coefficient obtained in operation 1105, $C_{mean}$, and $L_{mean}$ are substituted into the calculation formula for the offset factor, to obtain the offset factor in the linear model corresponding to the chroma block.

Operation 1107: Determine prediction information of the chroma block based on the scaling coefficient, the offset factor, and luma reconstruction information corresponding to the chroma block.

The luma reconstruction information corresponding to the chroma block includes downsampling information of a luma reconstructed block corresponding to the chroma block.

In an embodiment, after the scaling coefficient and the offset factor corresponding to the chroma block are obtained, the luma reconstruction information corresponding to the chroma block, the scaling coefficient, and the offset factor may be used to obtain the prediction information of the chroma block.

In an embodiment, a formula $pred_C((i,j)) = \alpha * rec'_L(i,j) + \beta$ may be used to obtain the prediction information of the chroma block, where $\alpha$ is the scaling coefficient, $\beta$ is the offset factor, $pred_C((i,j))$ is a predictor of a chroma sample at a location (i, j), and $rec'_L(i,j)$ is a luma reconstructed sample value at the location (i, j) of the luma block corresponding to the current chroma block.

If this embodiment of this application is applied to the encoder side, a difference only lies in a manner of determining an intra prediction mode. On the encoder side, if it is determined that an intra prediction method is used for a chroma block, the chroma block is encoded by using each intra prediction mode. Then, a rate-distortion optimization (RDO) criterion is used to determine an intra prediction mode with a best encoding effect, write the intra prediction mode into the foregoing syntax table, and add the intra prediction mode to a bitstream. In this way, the decoder side may directly determine, from the bitstream, an intra prediction mode that is to be used for decoding.

In an embodiment, a manner of determining the intra prediction mode by using the RDO criterion may be as follows:

Prediction information of the chroma block is determined in a manner of operation 1101 to operation 1107, the prediction information is subtracted from original information of the chroma block to obtain residual information, transform processing is performed on the residual information obtain a transform coefficient, quantization processing is performed on the transform coefficient to obtain a quantization coefficient, and entropy encoding processing is performed on the quantization coefficient to obtain a bitstream. Then, inverse entropy encoding processing, inverse quantization processing, and inverse transform processing are sequentially performed on the bitstream to perform intra prediction, to obtain reconstructed information, the reconstructed information is compared with the original information, and an intra prediction mode in which a difference between the reconstructed information and the original information is smallest is determined as a finally to-be-used intra prediction mode, that is, an intra prediction mode to be written into the foregoing syntax table.

It should be noted that the encoder side may be an encoder side using H.263, H.264, MPEG-2, MPEG-4, VP8, or VP9, and correspondingly, the decoder side may be a decoder side using H.263, H.264, MPEG-2, MPEG-4, VP8, or VP9.

It should be further noted that, this embodiment of this application is described by using only one row of neighboring samples as an example. This embodiment of this application may also be applied to a scenario of two rows of neighboring samples shown in FIG. 10, and a processing manner is the same as that in the case of one row of samples, but location coordinates of a preset quantity of location points are different.

In this embodiment of this application, during encoding or decoding, the chroma values of the chroma samples at the preset locations may be obtained from the neighboring samples of the chroma block. Then, the luma values of the luma samples corresponding to the chroma samples at the preset locations are obtained from the neighboring samples of the luma block corresponding to the chroma block, the obtained luma values are classified into the first luma set and the second luma set, and the chroma values are correspondingly classified into the first chroma set and the second chroma set based on the classification of the luma values. Next, the scaling coefficient in the linear model corresponding to the chroma block may be determined based on the average value of the luma values in the first luma set, the average value of the luma values in the second luma set, the average value of the chroma values in the first chroma set, and the average value of the chroma values in the second chroma set, and after the scaling coefficient is determined, the offset factor in the linear model corresponding to the chroma block may be determined based on the scaling coefficient. Finally, the prediction information of the chroma block is determined based on the scaling coefficient, the offset factor, and the luma reconstruction information corresponding to the chroma block. In this way, during encoding or decoding, a preset quantity of chroma values are selected and then classified into two chroma sets, and a preset quantity of luma values are selected and then classified into two luma sets. A scaling coefficient in a linear model corresponding to a chroma block is determined based on an average value of luma values in each luma set and an average value of chroma values in each chroma set, and further, an offset factor is determined. Because a smaller quantity of multiplications are involved, an encoding time and a decoding time can be reduced.

FIG. 17 is a structural diagram of a chroma block prediction apparatus according to an embodiment of this application. The apparatus may be implemented as a part of the apparatus or the entire apparatus by using software, hardware, or a combination thereof. The apparatus provided in this embodiment of this application may implement the procedure in FIG. 11 to FIG. 16(d) in the embodiments of this application. The apparatus includes an obtaining module 1710, a classification module 1720, and a determining module 1730.

Figure 11:
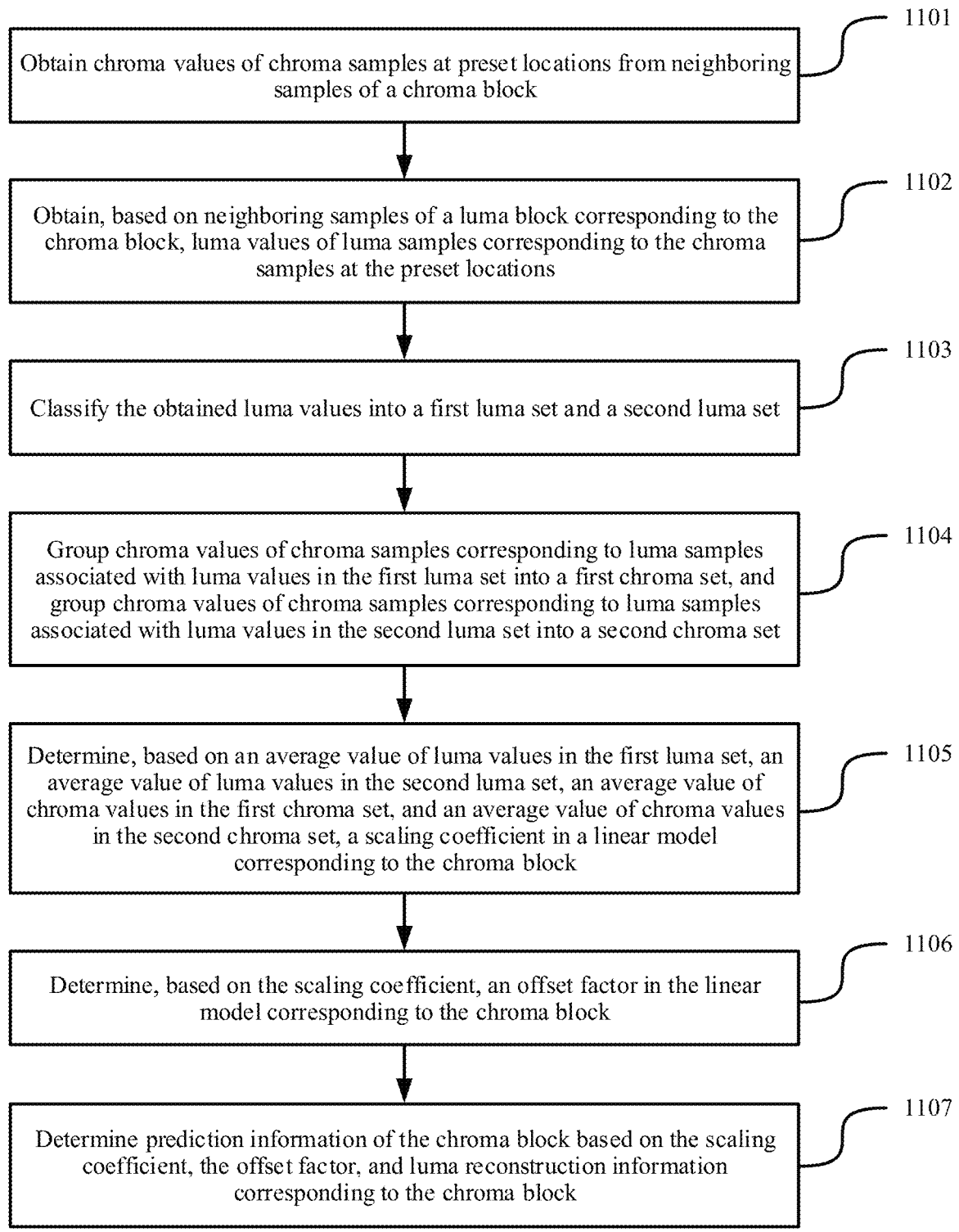
FIG. 11 is a schematic flowchart of a chroma block prediction method.

The obtaining module 1710 is configured to: obtain chroma values of chroma samples at preset locations from neighboring samples of a chroma block; and obtain, based on neighboring samples of a luma block corresponding to the chroma block, luma values of luma samples corresponding to the chroma samples at the preset locations, and may be specifically configured to implement the obtaining function in FIG. 11 and implicit operations included in FIG. 11.

The classification module 1720 is configured to: classify the obtained luma values into a first luma set and a second luma set; and group chroma values of chroma samples corresponding to luma samples associated with luma values in the first luma set into a first chroma set, and group chroma values of chroma samples corresponding to luma samples associated with luma values in the second luma set into a second chroma set, and may be specifically configured to implement the classification function in FIG. 11 and implicit operations included in FIG. 11.

The determining module 1730 is configured to: determine, based on an average value of the luma values in the first luma set, an average value of the luma values in the second luma set, an average value of the chroma values in the first chroma set, and an average value of the chroma values in the second chroma set, a scaling coefficient in a linear model corresponding to the chroma block; determine, based on the scaling coefficient, an offset factor in the linear model corresponding to the chroma block; and determine prediction information of the chroma block based on the scaling coefficient, the offset factor, and luma reconstruction information corresponding to the chroma block, where the luma reconstruction information corresponding to the chroma block includes downsampling information of a luma reconstructed block corresponding to the chroma block, and may be specifically configured to implement the determining function in FIG. 11 and implicit operations included in FIG. 11.

In an embodiment, the obtaining module 1710 is further configured to:
  obtain indication information, and determine, based on the indication information, an intra prediction mode corresponding to the chroma block, where the intra prediction mode includes at least one of a linear mode LM, a linear mode above LMA, and a linear mode left LML; and
  determine the preset locations based on the intra prediction mode corresponding to the chroma block.

In an embodiment, the obtaining module 1710 is configured to:
  obtain the chroma values of the chroma samples at the preset locations from the neighboring samples of the chroma block based on a preset correspondence between an intra prediction mode and a preset location and the intra prediction mode corresponding to the chroma block.

In an embodiment, location coordinates of top neighboring samples of the chroma block are (0, −1), (1, −1), . . . , and (X−1, −1), and location coordinates of left neighboring samples of the chroma block are (−1, 0), (−1, 1), . . . , and (−1, Y−1); and
  if the intra prediction mode corresponding to the chroma block is a cross-component linear mode LM, location coordinates of the chroma samples at the preset locations are (0, −1), (X−1, −1), (−1, 0), and (−1, Y−1).

In an embodiment, the location coordinates of the top neighboring samples of the chroma block are (0, −1), (1, −1), . . . , and (X−1, −1); and
if the intra prediction mode corresponding to the chroma block is a cross-component linear mode above LMA, the location coordinates at the preset locations are (0, −1), (X/4, −1), (X−1−X/4, −1), and (X−1, −1), or (0, −1), (X/4, −1), (3*X/4, −1), and (X−1, −1).

In an embodiment, the location coordinates of the left neighboring samples of the chroma block are (−1, 0), (−1, 1), . . . , and (−1, Y−1); and
if the intra prediction mode corresponding to the chroma block is a cross-component linear mode left LML, the location coordinates at the preset locations are (−1, 0), (−1, Y/4), (−1, Y−1-Y/4), and (−1, Y−1), or (−1, 0), (−1, Y/4), (−1, 3*Y/4), and (−1, Y−1).

In an embodiment, the obtaining module 1710 is configured to:
determine, from the neighboring samples of the luma block, that location coordinates of a luma sample corresponding to a chroma sample at an $i^{th}$ preset location in the preset locations are $(2*X_i, 2*Y_i)$, where location coordinates of the chroma sample at the $i^{th}$ preset location are $(X_i, Y_i)$; and obtain, from the neighboring samples of the luma block corresponding to the chroma block based on location coordinates of the luma samples corresponding to the chroma samples at the preset locations, the luma values of the luma samples corresponding to the chroma samples at the preset locations; or
determine, from the neighboring samples of the luma block based on location coordinates of a chroma sample at a $j^{th}$ preset location in the preset locations, location coordinates of a plurality of samples corresponding to the $j^{th}$ preset location; determine, based on the location coordinates of the plurality of samples, location coordinates of a luma sample corresponding to the chroma sample at the $j^{th}$ preset location; and obtain, from the neighboring samples of the luma block corresponding to the chroma block based on location coordinates of the luma samples corresponding to the chroma samples at the preset locations, the luma values of the luma samples corresponding to the chroma samples at the preset locations.

In an embodiment, the classification module 1720 is configured to:
determine an average value of the luma values of the luma samples corresponding to the chroma samples at the preset locations; and
group luma values that are in the luma values of the luma samples corresponding to the chroma samples at the preset locations and that are less than or equal to the average value of the luma values into the first luma set, and group luma values that are in the luma values of the luma samples corresponding to the chroma samples at the preset locations and that are greater than the average value of the luma values into the second luma set.

In an embodiment, the classification module 1720 is configured to:
sort the luma values of the luma samples corresponding to the chroma samples at the preset locations in ascending order, to obtain a first luma value queue; and if a quantity of luma samples in the first luma value queue is an even number, group luma values of the first half part in the first luma value queue into the first luma set, and group luma values of the second half part in the luma value queue into the second luma set; or
sort the luma values of the luma samples corresponding to the chroma samples at the preset locations in descending order, to obtain a second luma value queue; and if a quantity of luma samples in the second luma value queue is an even number, group luma values of the second half part in the second luma value queue into the first luma set, and group luma values of the first half part in the luma value queue into the second luma set.

In an embodiment, the determining module 1730 is configured to:

$$\alpha = \frac{C_{Lmean} - C_{Rmean}}{L_{Lmean} - L_{Rmean}},$$

where α is the scaling coefficient in the linear model corresponding to the chroma block, $C_{Lmean}$ is the average value of the chroma values in the first chroma set, $C_{Rmean}$ is the average value of the chroma values in the second chroma set, $L_{Lmean}$ is Rmean the average value of the luma values in the first luma set, and $L_{Rmean}$ is the average value of the luma values in the second luma set.

In an embodiment, the determining module 1730 is configured to:
determine, based on the scaling coefficient, the average value of the chroma values in the first chroma set, and the average value of the luma values in the first luma set, the offset factor in the linear model corresponding to the chroma block.

In an embodiment, the determining module 1730 is configured to:
$\beta = C_{Lmean} - \alpha * L_{Lmean}$, where α is the scaling coefficient, β is the offset factor in the linear model corresponding to the chroma block, $C_{Lmean}$ is the average value of the chroma values in the first chroma set, and $L_{Lmean}$ is the average value of the luma values in the first luma set.

In an embodiment, the determining module 1730 is configured to:
determine, based on the scaling coefficient, an average value of the chroma values of the chroma samples at the preset locations, and the average value of the luma values of the luma samples corresponding to the chroma samples, the offset factor in the linear model corresponding to the chroma block.

In an embodiment, the determining module 1730 is configured to:
$\beta = C_{mean} - \alpha * L_{mean}$, where α is the scaling coefficient, β is the offset factor in the mean linear model corresponding to the chroma block, $C_{mean}$ is the average value of the chroma values of the chroma samples at the preset locations, and $L_{mean}$ is the average value of the luma values of the luma samples corresponding to the chroma samples at the preset locations.

In the embodiments of this application, during encoding or decoding, the chroma values of the chroma samples at the preset locations may be obtained from the neighboring samples of the chroma block. Then, the luma values of the luma samples corresponding to the chroma samples at the preset locations are obtained from the neighboring samples of the luma block corresponding to the chroma block, the obtained luma values are classified into the first luma set and the second luma set, and the chroma values are correspondingly classified into the first chroma set and the second chroma set based on the classification of the luma values.

Next, the scaling coefficient in the linear model corresponding to the chroma block may be determined based on the average value of the luma values in the first luma set, the average value of the luma values in the second luma set, the average value of the chroma values in the first chroma set, and the average value of the chroma values in the second chroma set, and after the scaling coefficient is determined, the offset factor in the linear model corresponding to the chroma block may be determined based on the scaling coefficient. Finally, the prediction information of the chroma block is determined based on the scaling coefficient, the offset factor, and the luma reconstruction information corresponding to the chroma block. In this way, during encoding or decoding, a preset quantity of chroma values are selected and then classified into two chroma sets, and a preset quantity of luma values are selected and then classified into two luma sets. A scaling coefficient in a linear model corresponding to a chroma block is determined based on an average value of luma values in each luma set and an average value of chroma values in each chroma set, and further, an offset factor is determined. Because a smaller quantity of multiplications are involved, an encoding time and a decoding time can be reduced.

It should be noted that, when the chroma block prediction apparatus provided in the foregoing embodiment determines chroma block prediction information, division of the foregoing function modules is merely used as an example for description. In actual application, the foregoing functions may be allocated to different function modules as required. In other words, an internal structure of the apparatus is divided into different function modules to complete all or some of the described functions. In addition, the chroma block prediction apparatus provided in the foregoing embodiment has a same concept as the chroma block prediction method embodiment. For details about an embodiment process of the chroma block prediction apparatus, refer to the method embodiment. Details are not described herein again.

This application further provides a computer-readable storage medium. The computer-readable storage medium stores an instruction, and when the computer-readable storage medium is run on a computing device, the computing device is enabled to perform the chroma block prediction method.

This application further provides a computer program product including an instruction. When the computer program product is run on a computing device, the computing device is enabled to perform the chroma block prediction method.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, and a magnetic tape), an optical medium (for example, a digital video disk (DVD)), or a semiconductor medium (for example, a solid-state drive).

The foregoing descriptions are merely specific implementations of this application, but are not intended to limit this application. Any modification, equivalent replacement, or improvement made without departing from the spirit and principle of this application should fall within the protection scope of this application.

What is claimed is:

1. A chroma block prediction method implemented by an encoder, comprising:
   determining preset locations based on an intra prediction mode corresponding to a chroma block;
   obtaining four chroma values of chroma samples at the preset locations;
   obtaining, based on neighboring samples of a luma block corresponding to a chroma block, four luma values of luma samples corresponding to the four chroma values of the chroma samples at the preset locations;
   classifying the four luma values into two smaller luma values and two larger luma values by sorting the four luma values;
   grouping the two smaller luma values into a first luma set, and grouping the two larger luma values into a second luma set;
   grouping chroma values of chroma samples corresponding to luma samples associated with luma values in the first luma set into a first chroma set, and grouping chroma values of chroma samples corresponding to luma samples associated with luma values in the second luma set into a second chroma set;
   determining a scaling coefficient in a linear model corresponding to the chroma block based on an average value of the luma values in the first luma set, an average value of the luma values in the second luma set, an average value of the chroma values in the first chroma set, and an average value of the chroma values in the second chroma set;
   determining, based on the scaling coefficient, an offset factor in the linear model corresponding to the chroma block; and
   determining prediction information of the chroma block based on the scaling coefficient, the offset factor, and luma reconstruction information corresponding to the chroma block, wherein the luma reconstruction information corresponding to the chroma block comprises downsampling information of a luma reconstructed block corresponding to the chroma block;
   encoding indication information into a bitstream, wherein the indication information is used to indicate the intra prediction mode corresponding to the chroma block, wherein the intra prediction mode is a linear mode above (LMA) mode.

2. The method according to claim 1, wherein obtaining the four chroma values of the chroma samples comprises:
   obtaining the chroma values of the chroma samples at preset locations from neighboring samples of the chroma block based on a preset correspondence between an intra prediction mode and a preset location and the intra prediction mode corresponding to the chroma block.

3. The method according to claim 1, wherein classifying the four luma values into two smaller luma values and two larger luma values by sorting the four luma values comprises:

sorting the four luma values of the luma samples corresponding to the chroma samples at preset locations in ascending order, to obtain a first luma value queue, a first half part in the first luma value queue comprises the 2 smaller luma values of the first luma value queue, and a second half part in the first luma value queue comprises the 2 larger luma values of the first luma value queue; or sorting the four luma values of the luma samples corresponding to the chroma samples at the preset locations in descending order, to obtain a second luma value queue, a first half part in the second luma value queue comprises the 2 larger luma values of the second luma value queue, and a second half part in the second luma value queue comprises the 2 smaller luma values of the second luma value queue.

4. The method according to claim 1, wherein the determining, based on the scaling coefficient, an offset factor in the linear model corresponding to the chroma block comprises:

determining, based on the scaling coefficient, the average value of the chroma values in the first chroma set, and the average value of the luma values in the first luma set, the offset factor in the linear model corresponding to the chroma block.

5. The method according to claim 4, wherein the determining, based on the scaling coefficient, the average value of the chroma values in the first chroma set, and the average value of the luma values in the first luma set, the offset factor in the linear model corresponding to the chroma block comprises:

$\beta = C_{Lmean} - \alpha * L_{Lmean}$, wherein $\alpha$ is the scaling coefficient, $\beta$ is the offset factor in the linear model corresponding to the chroma block, $C_{Lmean}$ is the average value of the chroma values in the first chroma set, and $L_{Lmean}$ is the average value of the luma values in the first luma set.

6. The method according to claim 1, wherein the determining, based on the scaling coefficient, an offset factor in the linear model corresponding to the chroma block comprises:

determining, based on the scaling coefficient, an average value of the chroma values of the chroma samples at preset locations, and the average value of the luma values of the luma samples corresponding to the chroma samples, the offset factor in the linear model corresponding to the chroma block.

7. The method according to claim 6, wherein the determining, based on the scaling coefficient, an average value of the chroma values of the chroma samples at the preset locations, and the average value of the luma values of the luma samples corresponding to the chroma samples, the offset factor in the linear model corresponding to the chroma block comprises:

$\beta = C_{Lmean} - \alpha * L_{mean}$, wherein $\alpha$ is the scaling coefficient, $\beta$ is the offset factor in the linear model corresponding to the chroma block, $C_{mean}$ is the average value of the chroma values of the chroma samples at the preset locations, and $L_{mean}$ is the average value of the luma values of the luma samples corresponding to the chroma samples at the preset locations.

8. A chroma block prediction apparatus, comprising:
one or more processors; and
a non-transitory computer-readable storage medium coupled to the one or more processors and storing instructions for execution by the one or more processors, wherein the instructions, when executed by the one or more processors, cause the apparatus to:

determine preset locations based on an intra prediction mode corresponding to a chroma block;

obtain four chroma values of chroma samples at the preset locations; and obtain, based on neighboring samples of a luma block corresponding to a chroma block, four luma values of luma samples corresponding to the four chroma values of the chroma samples at the preset locations;

classify the four luma values into two smaller luma values and two larger luma values by sorting the four luma values;

group the two smaller luma values into a first luma set, and group the two larger luma values into a second luma set;

group chroma values of chroma samples corresponding to luma samples associated with luma values in the first luma set into a first chroma set, and group chroma values of chroma samples corresponding to luma samples associated with luma values in the second luma set into a second chroma set; and determine a scaling coefficient in a linear model corresponding to the chroma block based on an average value of the luma values in the first luma set, an average value of the luma values in the second luma set, an average value of the chroma values in the first chroma set, and an average value of the chroma values in the second chroma set;

determine, based on the scaling coefficient, an offset factor in the linear model corresponding to the chroma block;

determine prediction information of the chroma block based on the scaling coefficient, the offset factor, and luma reconstruction information corresponding to the chroma block, wherein the luma reconstruction information corresponding to the chroma block comprises downsampling information of a luma reconstructed block corresponding to the chroma block;

encode indication information into a bitstream, wherein the indication information is used to indicate the intra prediction mode corresponding to the chroma block, wherein the intra prediction mode is a linear mode above (LMA) mode.

9. The apparatus according to claim 8, wherein the one or more processors are further configured to:

obtain the chroma values of the chroma samples at preset locations from the neighboring samples of the chroma block based on a preset correspondence between an intra prediction mode and a preset location and the intra prediction mode corresponding to the chroma block.

10. The apparatus according to claim 8, wherein the one or more processors are configured to:

sort the four luma values of the luma samples corresponding to the chroma samples at the preset locations in ascending order, to obtain a first luma value queue, a first half part in the first luma value queue comprises the 2 smaller luma values of the first luma value queue, and a second half part in the first luma value queue comprises the 2 larger luma values of the first luma value queue; or sort the four luma values of the luma samples corresponding to the chroma samples at the preset locations in descending order, to obtain a second luma value queue, a first half part in the second luma value queue comprises the 2 larger luma values of the second luma value queue, and a second half part in the second luma value queue comprises the 2 smaller luma values of the second luma value queue.

11. The apparatus according to claim 8, wherein the one or more processors are configured to:
determine, based on the scaling coefficient, the average value of the chroma values in the first chroma set, and the average value of the luma values in the first luma set, the offset factor in the linear model corresponding to the chroma block.

12. The apparatus according to claim 11, wherein the offset factor in the linear model corresponding to the chroma block is represented by $\beta = C_{Lmean} - \alpha * L_{Lmean}$, wherein $\alpha$ is the scaling coefficient, $\beta$ is the offset factor in the linear model corresponding to the chroma block, $C_{Lmean}$ is the average value of the chroma values in the first chroma set, and $L_{mean}$ is the average value of the luma values in the first luma set.

13. A non-transitory computer-readable storage medium storing an instruction and a bitstream that is generated by a video encoding method, wherein the bitstream comprises encoded video data and indication information, wherein the indication information is used to indicate an intra prediction mode corresponding to a chroma block, wherein the intra prediction mode is a linear mode above (LMA) mode, which when the instruction is performed by a processor, cause the processor to perform operations of:
determining preset locations based on an intra prediction mode corresponding to a chroma block;
obtaining four chroma values of chroma samples at the preset locations;
obtaining, based on neighboring samples of a luma block corresponding to a chroma block, four luma values of luma samples corresponding to the four chroma values of the chroma samples at the preset locations;
classifying the four luma values into two smaller luma values and two larger luma values by sorting the four luma values;
grouping the two smaller luma values into a first luma set, and grouping the two larger luma values into a second luma set;
grouping chroma values of chroma samples corresponding to luma samples associated with luma values in the first luma set into a first chroma set, and grouping chroma values of chroma samples corresponding to luma samples associated with luma values in the second luma set into a second chroma set;
determining a scaling coefficient in a linear model corresponding to the chroma block based on an average value of the luma values in the first luma set, an average value of the luma values in the second luma set, an average value of the chroma values in the first chroma set, and an average value of the chroma values in the second chroma set;
determining, based on the scaling coefficient, an offset factor in the linear model corresponding to the chroma block; and
determining prediction information of the chroma block based on the scaling coefficient, the offset factor, and luma reconstruction information corresponding to the chroma block, wherein the luma reconstruction information corresponding to the chroma block comprises downsampling information of a luma reconstructed block corresponding to the chroma block;
encoding indication information into a bitstream, wherein the indication information is used to indicate the intra prediction mode corresponding to the chroma block, wherein the intra prediction mode is a linear mode above (LMA) mode.

14. The non-transitory computer-readable storage medium according to claim 13, wherein the instruction further cause the processor to perform operations of:
obtaining the chroma values of the chroma samples at preset locations from neighboring samples of the chroma block based on a preset correspondence between an intra prediction mode and a preset location and the intra prediction mode corresponding to the chroma block.

15. The non-transitory computer-readable storage medium according to claim 13, wherein the instruction further cause the processor to perform operations of:
sorting the four luma values of the luma samples corresponding to the chroma samples at preset locations in ascending order, to obtain a first luma value queue, a first half part in the first luma value queue comprises the 2 smaller luma values of the first luma value queue, and a second half part in the first luma value queue comprises the 2 larger luma values of the first luma value queue; or
sorting the four luma values of the luma samples corresponding to the chroma samples at the preset locations in descending order, to obtain a second luma value queue, a first half part in the second luma value queue comprises the 2 larger luma values of the second luma value queue, and a second half part in the second luma value queue comprises the 2 smaller luma values of the second luma value queue.

16. The non-transitory computer-readable storage medium according to claim 13, wherein the instruction further cause the processor to perform operations of:
determining, based on the scaling coefficient, the average value of the chroma values in the first chroma set, and the average value of the luma values in the first luma set, the offset factor in the linear model corresponding to the chroma block.

17. The non-transitory computer-readable storage medium according to claim 16, wherein the determining, based on the scaling coefficient, the average value of the chroma values in the first chroma set, and the average value of the luma values in the first luma set, the offset factor in the linear model corresponding to the chroma block comprises:
$\beta = C_{Lmean} - \alpha * L_{Lmean}$, wherein $\alpha$ is the scaling coefficient, $\beta$ is the offset factor in the linear model corresponding to the chroma block, $C_{Lmean}$ is the average value of the chroma values in the first chroma set, and $L_{Lmean}$ is the average value of the luma values in the first luma set.

18. The non-transitory computer-readable storage medium according to claim 13, wherein the instruction further cause the processor to perform operations of:
determining, based on the scaling coefficient, an average value of the chroma values of the chroma samples at preset locations, and the average value of the luma values of the luma samples corresponding to the chroma samples, the offset factor in the linear model corresponding to the chroma block.

* * * * *